(12) United States Patent
Pope et al.

(10) Patent No.: US 8,062,129 B2
(45) Date of Patent: Nov. 22, 2011

(54) PHYSIOLOGICAL USER INTERFACE FOR A MULTI-USER VIRTUAL ENVIRONMENT

(76) Inventors: Alan T. Pope, Poquoson, VA (US); Olafur S. Palsson, Durham, NC (US)

( * ) Notice: Subject to any disclaimer, the term of this patent is extended or adjusted under 35 U.S.C. 154(b) by 1331 days.

(21) Appl. No.: 11/536,811

(22) Filed: Sep. 29, 2006

(65) Prior Publication Data

US 2008/0081692 A1 Apr. 3, 2008

(51) Int. Cl.
*G06F 17/00* (2006.01)

(52) U.S. Cl. .......................................................... 463/31

(58) Field of Classification Search .............. 463/30–32, 463/37, 42
See application file for complete search history.

(56) References Cited

U.S. PATENT DOCUMENTS

| | | |
|---|---|---|
| 3,419,732 A | 12/1968 | Lane |
| 3,837,331 A | 9/1974 | Ross |
| 3,855,998 A | 12/1974 | Hidalgo-Briceno |
| 3,877,466 A | 4/1975 | Montor |
| 3,890,957 A | 6/1975 | Freeman |
| 3,893,450 A | 7/1975 | Ertl |
| 3,991,304 A | 11/1976 | Hillsman |
| 4,149,716 A | 4/1979 | Scudder |
| 4,162,793 A | 7/1979 | Cummings |
| 4,171,696 A | 10/1979 | John |
| 4,358,118 A | 11/1982 | Plapp |
| 4,926,969 A | 5/1990 | Wright et al. |
| 5,213,338 A | 5/1993 | Brotz |
| RE34,728 E | 9/1994 | Hall-Tipping |
| 5,377,100 A | 12/1994 | Pope et al. |
| 5,720,619 A | 2/1998 | Fisslinger |
| 5,860,935 A | 1/1999 | Blaszynski et al. |
| 5,913,310 A | 6/1999 | Brown |
| 5,974,262 A | 10/1999 | Fuller et al. |
| 6,038,540 A * | 3/2000 | Krist et al. .................. 705/8 |
| 6,402,520 B1 | 6/2002 | Freer |
| 6,425,764 B1 | 7/2002 | Lamson |
| 6,450,820 B1 | 9/2002 | Palsson et al. |
| 6,496,724 B1 | 12/2002 | Levendowski et al. |
| 6,503,085 B1 | 1/2003 | Elkind |
| 2006/0262120 A1* | 11/2006 | Rosenberg .................. 345/473 |
| 2007/0066403 A1* | 3/2007 | Conkwright ................ 463/43 |
| 2008/0208016 A1* | 8/2008 | Hughes et al. .............. 600/301 |

FOREIGN PATENT DOCUMENTS

| | | |
|---|---|---|
| JP | 9094350 | 4/1997 |
| JP | 2001087561 | 4/2001 |
| WO | WO 9614627 | 5/1996 |
| WO | WO 0165358 | 9/2001 |

* cited by examiner

*Primary Examiner* — Ronald Laneau
(74) *Attorney, Agent, or Firm* — Kimberly A. Chasteen

(57) ABSTRACT

A system and method for incorporating biofeedback training into each user's interaction with a multi-user virtual environment, such as a multi-user videogame or a multi-user computer-simulated task, and for enhancing each user's sense of immersion in the multi-user virtual environment, by using measured values of physiological functions received as real-time outputs from at least one biosensory device operatively connected to each user while each user is interacting with the multi-user virtual environment to influence a score of each user's performance, such that each user demonstrating relatively superior physiological self-regulatory skill is rewarded and each user demonstrating relatively inferior physiological self-regulatory skill is penalized.

99 Claims, 3 Drawing Sheets

PHYSIOLOGICAL USER INTERFACE FOR A MULTI-USER VIRTUAL ENVIRONMENT

BACKGROUND OF THE INVENTION

1. Technical Field

This invention relates generally to an apparatus and method incorporating biofeedback training into a computer-generated multi-user virtual environment, and augmenting a computer user's sense of immersion in the computer-generated multi-user virtual environment by adding physiological interactivity to the multi-user virtual environment and by influencing the scoring of performance in the multi-user virtual environment with measured values of a user's physiological functions.

2. Related Art

Because of the association of certain human physiological states with the optimal performance of certain human activities and behaviors, or the attainment of superior states of health, biofeedback training directed to self-regulating such physiological states seeks to optimize the performance of their associated actions, behaviors, and states of health, thereby facilitating mastery in action and well-being. For example, a self-induced reduction of an elevated heart rate and blood pressure, typically associated with anxiety, may be expected to move a person into a state superior focus with respect to a challenge and its resolution, which state is better suited for victory over an opponent in real or simulated combat or completion of a real or simulated task.

Biofeedback training techniques for physiological self-regulation are fundamentally grounded upon repetition and the frequency of repetition, techniques for which persons have varying and limiting tolerances, particularly if their practice of biofeedback is undertaken in an environment that is not motivating because it fails to engender excitement, enthusiasm, challenge, stimulation, or curiosity. The absence of such motivating feelings often results in noncompliance with biofeedback training—a persistent and pervasive problem that has limited the effectiveness of biofeedback training incorporated into videogames and computer simulations to date.

Biofeedback training programmed into videogames or computer simulations has been limited to single-user videogames or single-user computer simulations, wherein the user is made aware of only some of his or her own monitored physiological functions, and the user's interaction with the videogame or computer simulation is modulated only by the control of his or her own physiological functions. In effect, the user competes only with himself or herself, and this has been found to limit commitment to play and participation, with a concomitant decline in biofeedback-mediated self-regulation of the user's physiological state.

The present invention makes biofeedback training more inherently self-motivating by incorporating biofeedback training into a computer-generated multi-user virtual environment ("MUVE") and augmenting the computer-generated audio and video interfaces that create the sensation of immersion in a MUVE with a physiological user interface that enhances the users' sense of immersion in the MUVE by:

[i] physiologically modulating the physical control inputs used by each of the players in the multi-user videogame or each of the participants in the multi-user computer-simulated task; and,

[ii] incorporating measured values of physiological functions of each of the players in the multi-user videogame or each of the participants in the multi-user computer-simulated task into the score by which performance in the multi-user videogame or multi-user computer-simulated task is graded; and,

[iii] subject to rules governing participation in the multi-user videogame or the multi-user computer-simulated task, making the performance scores and a physiological performance profile of each player or participant visible or invisible on the output devices of other players or participants, thereby creating physiologically competitive and cooperative incentives in the multi-user videogame and the multi-user computer-simulated task.

SUMMARY OF THE INVENTION

The invention is a system and method for incorporating biofeedback training into a computer-generated MUVE, having a first exemplary embodiment as a multi-user videogame and a second exemplary embodiment as a multi-user computer-simulated task, and enhancing each user's sense of immersion in said MUVE, with a physiological user interface that:

[i] adds a novel repertoire of physiologically-modulated, outcome-influencing, biofeedback skills to the existing judgmental skills and hand-eye coordinated physical skills needed to participate in the multi-user videogame or multi-user computer-simulated task; and,

[ii] uses measured values of physiological functions of each of the users to influence the score that grades the performance of each user in the multi-user videogame or multi-user computer-simulated task, so as to award users demonstrating relatively superior physiological self-regulatory skill and to penalize participants demonstrating relatively inferior physiological self-regulatory skill; and,

[iii] subject to rules governing participation in the multi-user videogame or multi-user computer-simulated task, makes all or part of the performance scores and a physiological performance profile of each user of the multi-user videogame or multi-user computer-simulated task visible or invisible on the output devices of other users of the multi-user videogame or multi-user computer-simulated task, thereby creating competitive or cooperative incentives in the multi-user videogame of multi-user computer-simulated task.

The invention makes any multi-user videogame or multi-user computer-simulated task more engaging and hence more effective as a device for teaching physiological self-regulation, by incorporating as a competitive or cooperative interactive feature in the multi-user videogame or the multi-user computer-simulated task, each user's ability to self-regulate aspects of his or her physiology, such as for example, blood pressure and heart rate.

The invention encourages the exercise of novel biofeedback skills by each player of a multi-user videogame or each participant in a multi-user computer-simulated task, which skills, for example, require each player of a multiplayer videogame to control aspects of his or her physiological state and to learn to self-induce certain physiological changes that have the effect of securing a competitive advantage over opponents playing the same multiplayer videogame; or, for example, require each participant in a multi-user computer-simulated task to control aspects of his or her physiological state and to learn to self-induce certain physiological changes that have the effect of securing a cooperative synergy among other participants engaged in the same multi-user computer-simulated task.

The physiological performance points that influence the progress and outcome of the multi-user videogame or the multi-user computer-simulated task are derived from real-time measurements of each user's physiological functions while engaged in the competition of the multi-user videogame or cooperation of the multi-user computer-simulated task; and, these points are distributed to each user by a program ranking the comparative physiological states of the users based on the relative excellence of the users' physiological states relative to one another, or relative to individually pre-determined criteria.

This novel form of physiologically-modulated interaction in a multi-user videogame or a multi-user computer-simulated task teaches and encourages performance-enhancing physiological self-regulation and health-enhancing physiological self-regulation; and, additionally, has entertainment value that engenders the excitement, enthusiasm, challenge, stimulation, or curiosity necessary to motivate and sustain a commitment to physiological self-regulatory mastery.

Consequently, it is an objective of invention to:
[i] teach the conscious attainment of physiological states optimally suited for performing certain actions or executing certain behaviors; and,
[ii] teach the attainment and maintenance of healthful physiological states; and,
[iii] motivate interest, attention, and commitment to physiological self-regulation by participation in multi-user videogames and multi-user computer-simulated tasks.

BRIEF DESCRIPTION OF THE DRAWINGS

For a better understanding of the invention, reference may be had to the accompanying drawings in which.

DETAILED DESCRIPTION OF THE INVENTION

Figure 1:
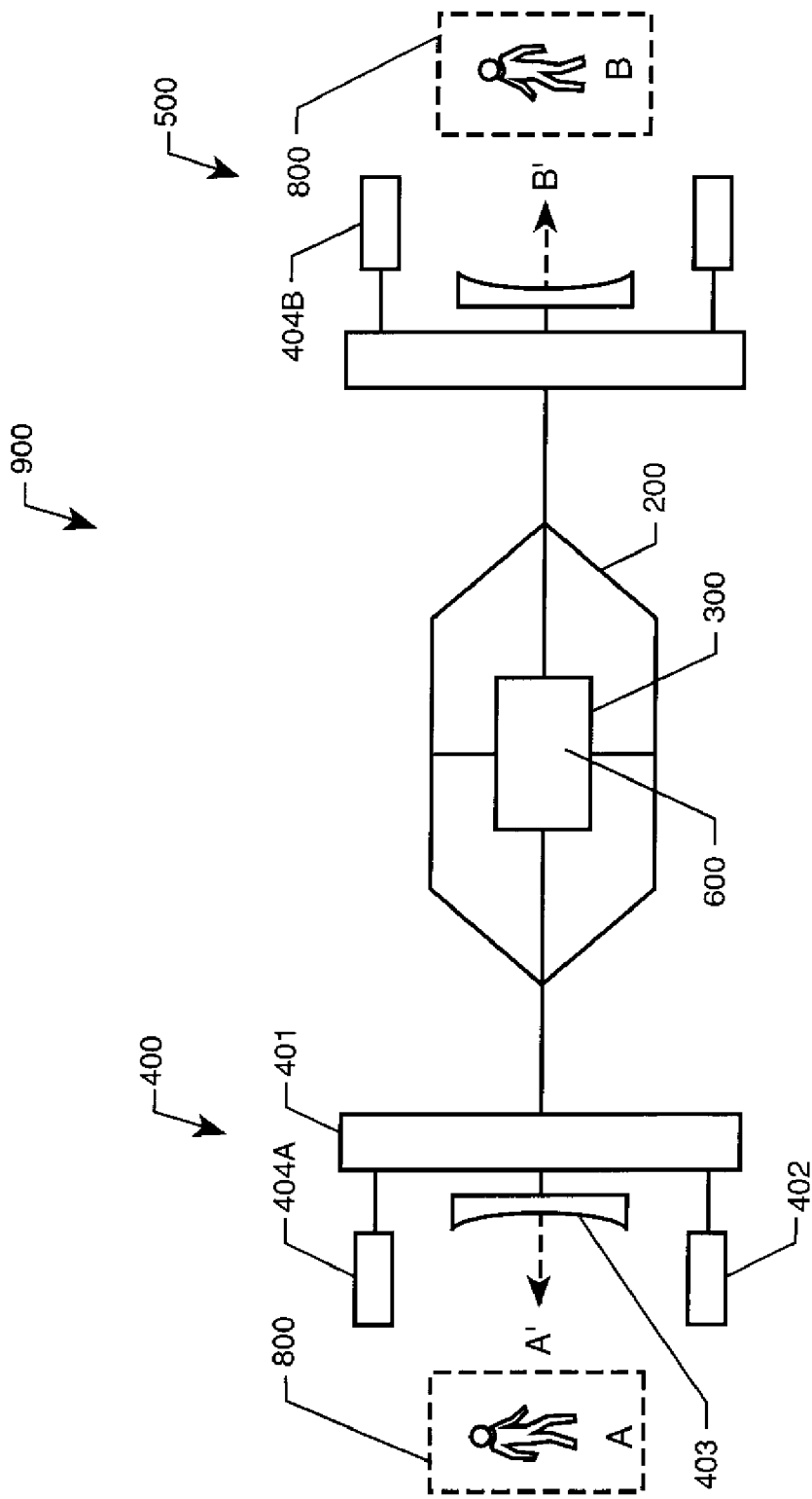
FIG. 1 is a schematic illustration of an embodiment of the invention.

The human autonomic nervous system is responsible for the autonomic execution and control of a number of physiological functions that are either vital to life or to the normal performance of a bodily function or to the normal performance of organ systems supportive of life. Some common examples of human physiological functions include, respiration, digestion, circulation, excretion, sight, and hearing.

In general, human physiological functions may be associated with one or more biomechanical effects, such as for example, a palpable pulse or the diastolic or systolic blood pressure, measured, for example, by a sphygmomanometer. Human physiological functions may also be associated with a bioelectrical signal, such as, for example, the time-dependent magnitude and sign of the wave of cardiac depolarization measured and drawn by an electrocardiogram ("ECG").

Accordingly, biomechanical effects or bioelectrical signals associated with human physiological functions produce physiological parameters or physiological parametric functions, having measurable values that are well known in the medical arts.

For example, the human physiological function of respiration is characterized, inter alia, by such physiological parameters as the respiratory rate ("RR") in respirations per minute, tidal volume, end-expiratory pressure, and other physiological parameters. Respiratory function may be further characterized by another physiological parameter called the "percent sat" or "$O_2$ sat," that is indicative of the percentage of red blood cell-borne hemoglobin that is saturated with oxygen, as measured by a pulse oximeter placed on a digit of a person.

Other examples of physiological parameters include, but are not limited to, skin temperature ("ST"), body temperature ("BT"), intraocular pressure ("IOP"), intracranial pressure ("ICP"), the galvanic skin response ("GSR"), and pupillary dilation.

As indicated hereinabove, measurements of biomechanical effects or bioelectrical signals associated with human physiological functions also produce correlative time-dependent physiological parametric functions that are also well known in the medical arts.

Circulation is an example of a human physiological function that is characterized, inter alia, by both physiological parameters and physiological parametric functions. Among the physiological parametric functions descriptive of circulation is the time-dependent electrocardiogram ("ECG") waveform of depolarization and repolarization occurring during a cycle of cardiac contraction and relaxation, that is characterized by such features as its P wave, QRS complex, T wave, ST segment. Examples of other physiological parametric functions correlated with human physiological functions include, the electroencephalogram ("EEG"), the electromyogram ("EMG"), and the visually-evoked potential ("VEP").

Circulation is further characterized by such physiological parameters as the heart rate ("HR"), measured in beats per minute, and the blood pressure ("BP"), recorded as the ratio of the systolic blood pressure, measured in millimeters of mercury ("mm Hg"), to the diastolic blood pressure, also measured in mm Hg.

Prevailing medical usage departs from the technical distinction, made in the foregoing discussion, between a physiological function and the physiological parameters or physiological parametric functions representative of that physiological function. Accordingly as used hereinafter the terms "measured value of a physiological function" or "measured value" shall mean the magnitude of a human physiological parameter or the magnitude of a physiological parametric function representative of a quantitative aspect of any human physiological function, including central nervous system electroencephalographic activity and muscular electromyographic activity.

Certain combinations of, or changes in, the measured values of physiologic functions may be used as signs or indices of emotional or behavioral states, in addition to serving as signs of medical states. For example, tachycardia, an increase in a participant's HR, may be used as an index generally associated with the degree of fear a person is experiencing. Tachycardia accompanied by tachypnea, i.e., shortness of breath, an elevation in the BP and a decrease in $O_2$ sat may accompany the experience of frank panic. On the other hand, a low, regular and rhythmic HR may correspond to a state of relatively greater equanimity, calm, or relaxation.

As a further example, a sharp increase in a subject's RR, i.e., hyperventilation, may be used not only as a measure of change in respiratory performance, but also as an index that is reflective of an emotional state such as, for example, fear or anxiety. A modest increase in a subject's RR may be used as an index reflective of the experience of stress. A modest lowering in RR may correspond to a state of relatively greater equanimity, or relaxation; whereas, a sharp decrease in RR, or hypoventilation, may correspond to a state of obtundation. Tachypnea, indicative of a rapid rate of breathing with little air exchange, akin to gasping, may also indicate respiratory dysfunction or a state of heightened anxiety that could, for example, interfere with a mission-critical task or behavior.

Similarly, an increase in body temperature, measured, for example, by a thermometer disposed in the outer canal of the ear, or an increase in the degree of perspiration, as measured by the GSR, are indices of a change in those physiologic functions that are generally associated with anxiety or stress.

The normal magnitudes or normal ranges of magnitudes of human physiological functions have been compiled and correlated with states of health or states of performance. For example, a resting HR of 60 beats per minute (bpm) is generally associated with healthy cardiac function. Deviations from the normal magnitudes or normal ranges of magnitudes of human physiological functions have been interpreted as medical signs of inferior health, disease, dysfunction or impairment. For example, a resting HR of 40 bpm is a sign of a bradycardia that may be the result of inferior health, disease, dysfunction or impairment of cardiac function.

By accrual over many years, there exists a vast compilation of measured values of physiological functions that have been normalized with respect to such exemplary variables as age, gender, weight, and occasionally race. This compilation has, for the most part, been organized into a taxonomy, well known in the medical arts, that associates measured values of physiological functions and combinations thereof with physiological states, ranging from excellent health to disease, dysfunction or impairment. This compilation of measured values of physiological functions and its associated taxonomic organization with physiological states of health and disease is available in whole or in part through various sources and repositories such as books, journals, databases, websites and the like.

It is also well known to those with ordinary skill in the medical, psychological, physiological, coaching and biofeedback arts that, in general, certain states of physiology, characterized by certain measured values of physiological functions, accompany, support and sustain certain states of mind such as, for example, anger, fear, concentration, equanimity, confidence; and, that, in general, certain states of physiology, characterized by certain measured values of physiological functions, accompany, support and sustain certain states of performance, such as, for example, peak performance. Contrariwise, the presence of yet other states of physiology characterized by yet other measured values of physiological functions efface or militate against the attainment of certain states of mind or performance. For example, the tachycardia, tachypnea and hypertension associated with a state of panic militate against either a state of focused concentration or a state of peak athletic performance.

As indicated hereinabove, biofeedback generally refers to an area of psychophysiological research and technologies by which a subject is trained to exert conscious control over certain unconscious physiological functions, generally controlled by the autonomic nervous system, such as, for example, the BP, HR and RR. The measured values of physiological functions may be received as inputs from a variety of biosensory devices and then displayed on an output device, i.e., "fed back," to the subject so that the subject is able to monitor them and to learn to consciously control the physiological functions they represent.

Accordingly, biofeedback techniques are used to consciously move a person's physiological functions from abnormal values to normal values; and, are also used to consciously make human physiological functions consonant with a desired state of mind or state of performance, whether such consonance entails altering a physiological state to make it consistent with the experience of a desired state of mind or state of performance, or, entails effacing a physiological state that is inconsistent with the experience of a desired state of mind or state of performance.

As used herein, the term "multi-user virtual environment" ("MUVE") refers to a software-generated and hardware-manifested virtual environment, in which the senses of a plurality of users are simultaneously engaged and stimulated by output devices, described hereinafter, which output devices create the perception by each user of an immersion in an environment in which objects exist and events transpire; and, in which each user participates to interact with objects and to influence events, typically by means of at least one manipulatable representation of the user appearing in the MUVE. The software generating the MUVE also responds to input from input devices operated by each user, described hereinafter, which input controls the actions and behavior of each user's representation.

As used herein, the term "user" or "participant" refers, without limitation, to an exemplary computer user among a plurality of users interacting with a MUVE, for example, by playing a multi-user videogame or participating in a multi-user computer-simulated task, either of which may be established over a network, or be established by a non-networked, stand-alone computer.

As used herein, the term "physiologic state" refers to the physiological performance of a human being defined by a set of at least one measured value of a physiological function. A normal physiological state obtains if all of the measured values of physiological functions indicating or defining the physiological state are within a predefined degree of statistical variability (e.g., standard deviation) from a statistical measure of central tendency (e.g., mean) of a normal population of individuals. An abnormal physiological state obtains if any one of the measured values of physiological functions indicating or defining the physiological state are not within a predefined degree of statistical variability from a statistical measure of central tendency of a normal population.

A superior physiological state obtains if at least one of the measured values of physiological functions defining a normal physiological state under a defined set of circumstances, has a supranormal value, or undergoes a supranormal change, or undergoes a supranormal rate of change, while all the remaining measured values of physiological functions that define the normal physiological state remain within a predefined degree of statistical variability from a statistical measure of central tendency of a normal population. For example, a superior physiological state would obtain if the RR of a jogger did not rise as rapidly as expected for a given acceleration of the pace at which the jogger runs, based upon RR statistics from a normal population.

Contrariwise, an inferior physiologic state obtains if at least one measured value of a physiological function of a set of measured values of physiological functions defining a normal physiological state under a defined set of circumstances, has an infranormal value, or undergoes an infranormal change or undergoes an infranormal rate of change, while all the remaining measured values of physiological functions that define the normal physiological state remain within a predefined degree of statistical variability from a statistical measure of central tendency of a normal population. For example, an inferior physiological state would obtain if the RR of a jogger rose more rapidly than expected for a given acceleration of the pace at which the jogger runs, based upon RR statistics from a normal population.

The use of the descriptor "supranormal" with respect to a measured value of a physiological function that is associated with superior physiological state is intended to reflect the fact that a superior physiological function may be associated with a measured value thereof that either increases in value, decreases in value, or undergoes no change in value. Similarly, the use of the descriptor "infranormal" with respect to a measured value of a physiological function associated with an inferior physiological state is intended to reflect the fact that inferior physiological function may also be associated with a measured value thereof that either increases in value, decreases in value, or undergoes no change in value. Consequently, any score that compiles winning or losing points based on the relative physiological supremacy or inferiority of multiple users participating in a MUVE is given user-specific, task-specific and event-specific criteria for making determinations of physiological supremacy or inferiority among those multiple users participating in the MUVE.

Referring now to the drawings in which like parts are designated by like numerals in the various views, FIG. 1 illustrates a schematic view of the invention, an apparatus denominated as a physiological user interface 900 comprising multi-user virtual environment 800 ("MUVE"), shown as dashed boxes encompassing each of two exemplary users that are symbolized by stick figures A and B, wherein each of the exemplary users A and B interacts with MUVE 800 by means of an output of at least one biosensory device 404A and 404B, respectively and operatively connected to each of the exemplary users A and B, which output contributes to a score of each user's performance while interacting with MUVE 800.

Biosensory devices 404A and 404B respectively communicate with exemplary interactive devices 400 and 500 that are disposed, together with exemplary server 300, on communications network 200. MUVE 800 is generated by exemplary multi-user virtual environment-generating software 600 ("MUVE-generating software"), which may, for example, be hosted on exemplary server 300, or may have components hosted by several other servers (not shown in FIG. 1) as well as exemplary interactive devices 400 and 500. MUVE 800 may, for example, have an embodiment as a multi-user videogame, or it may have an embodiment as a multi-user computer-simulated task.

Communications network 200, supports peer-to-peer file-sharing and interactive participation among a plurality of users, such as exemplary users A and B. Communications network 200 may comprise an intranet, local area network, wide area network, Wi-Fi network, or the Internet.

For the sake of clarity and simplicity, further detailed description of inventive elements common to exemplary interactive devices 400 and 500, which, in turn, represent a plurality of like interactive devices not shown in FIG. 1, will refer to only to interactive device 400, whose further description in connection with exemplary user A, and whose associated 400-series reference numerals will be understood to be equally applicable to exemplary interactive device 500 operated by exemplary user B and the plurality of like interactive devices not shown in FIG. 1.

Exemplary interactive device 400 comprises a local computing device 401 operatively connected to at least one input device 402, at least one output device 403, and at least one biosensory device 404 that is operatively attached to a user, such as exemplary user A.

Local computing device 401 may, for example, comprise a fixed or mobile computing or communications device, such as, for example, a personal computer, desktop computer, workstation, personal digital assistant ("PDA"), hand-held, wrist-worn, or garment-borne communications or computing device, a videogaming console, a laptop or notebook computer, a pager, or a cellular telephone, or any combination thereof having access to exemplary server 300 and supporting interactivity with exemplary MUVE-generating software 600.

Exemplary user A operates interactive device 400 to interact with MUVE 800 by controlling at least one representative avatar A', shown schematically in FIG. 1 as projecting from one or more output devices 403. Avatar A' comprises a user-manipulatable representation of a exemplary user A existing in MUVE 800, generally taking the form of a symbol, icon, cartoon character, agent, or other surrogate; or, a point of view, such as, for example, the "world" of MUVE 800 as seen through the "eyes" of an avatar such as avatar A'.

The behavior of avatar A' within MUVE 800 is controlled by decisions and actions of exemplary user A that are effected by one or more input devices 402. Input devices 402 may, for example, comprise a joystick, videogame control pad, keyboard, mouse, track pad, touchscreen, pressure-sensitive foot pad, cellular telephone, personal digital assistant "(PDA"), global positioning system ("GPS") device, wireless Internet access device, computer glove, stereotactically-sensitive input device, or any combination thereof, with which a user may access exemplary server 300 and interact with exemplary MUVE-generating software 600. Avatar A' may also be made to control a virtual instrumentality or device, such as, for example, a car, aircraft, tool, or, weapon that is made available under programmed rules that govern participation in MUVE 800.

The perception of a MUVE 800, in which objects exist and events transpire is effected by one or more output devices 403, which may, for example, comprise two- or three-dimensional video output devices, such as display screens, display goggles, spectacle-mounted video output devices, contact lens-embedded video devices, ophthalmic or retinal implants, holographic visual output devices, audio output devices, such as speakers, ear phones or headsets, and touch, temperature, vibratory, and kinesthetic output devices. Output devices 403 may also comprise probes, electrodes, implants, appurtenances or appliances in operational contact with exemplary user A, or gloves, shoes, wristbands, headbands, helmets or other apparel or garments worn by a exemplary user A. Output devices 403 may be organized into an assemblage of stand-alone devices, portable devices or both, and may be operationally connected to one or more of the appurtenances worn by exemplary user A.

A score having two components measures the performance of each user of MUVE 800, such as exemplary user A. The first component of the score is determined by each user's skill in using one or more input devices 402 to control the actions of his or her avatar in various scenarios and encounters arising within MUVE 800, such as, for example, the outcome of combat with an enemy avatar in a videogame embodiment of MUVE 800; or, for example, the outcome of a cooperative effort with a team-mate avatar, in a computer-simulated task embodiment of MUVE 800.

The second component of the score is determined by each user's skill in self-regulating his or her own physiological functioning while controlling his or her avatar using one or more input devices 402 in the various scenarios and encounters arising within MUVE 800. The second component of the score reflects the competition or cooperation engaged in by each user of MUVE 800 using measured values of his or her physiologic functions as described hereinafter.

Positive contributions to both the first component of the score and the second component of the score may take the form of positive performance points, comprising a numerical point increase in a user's score, or may comprise a gain of some advantageous element in MUVE 800, i.e., a "power-up element," that contributes to further success, such as, for example, the accrual of virtual fuel, food, ammunition, energy, longevity, shielding; or, the augmentation of some virtual power, capability or function of a user's avatar that also contributes to further success, such as, for example, extended range motion, or augmented effect of motion, or extended duration of activity. Contrariwise, negative contributions to the score may comprise a numerical point decrease; or, a gain of some disadvantageous element of MUVE 800, i.e., a "power-down element," that detracts from further success, or diminishes some virtual power, capability or function of a user's avatar that also detracts from further success. In some cases, a user may qualify for a gain of a certain advantageous element or game privilege only if the user has attained a threshold score that has been defined for that element or privilege.

As indicated, physiologic functions of exemplary user A are detected and measured by one or more biosensory devices 404. Biosensory device 404 may comprise at least one of a variety of biosensory devices, well known in the medical and physiological arts, whose output is fashioned into one or more signals encoding one or more measured values of physiological functions that correspond to autonomically-mediated physiological functions and brainwave electrical functions of exemplary user A.

Physiological functions of exemplary user A that are detected and measured by biosensory device 404 may, for example, comprise, skin temperature ("ST"), body temperature ("BT"), skin conductance (galvanic skin response or "GSR"), blood pressure ("BP"), blood flow, respiratory rate ("RR"), hemoglobin oxygen saturation ("$O_2$ sat"), heart rate ("HR"), heart rhythm and variability (electrocardiogram "ECG" rhythm strip), muscular electrical activity (electromyographic "EMG" activity); and, brain electrical activity (electroencephalographic "EEG" activity), comprising, for example, event-related potentials and waves of the brainwave frequency band, such as alpha waves, beta waves, gamma waves, theta waves, and sensorimotor ("SMR") waves.

Figure 2:
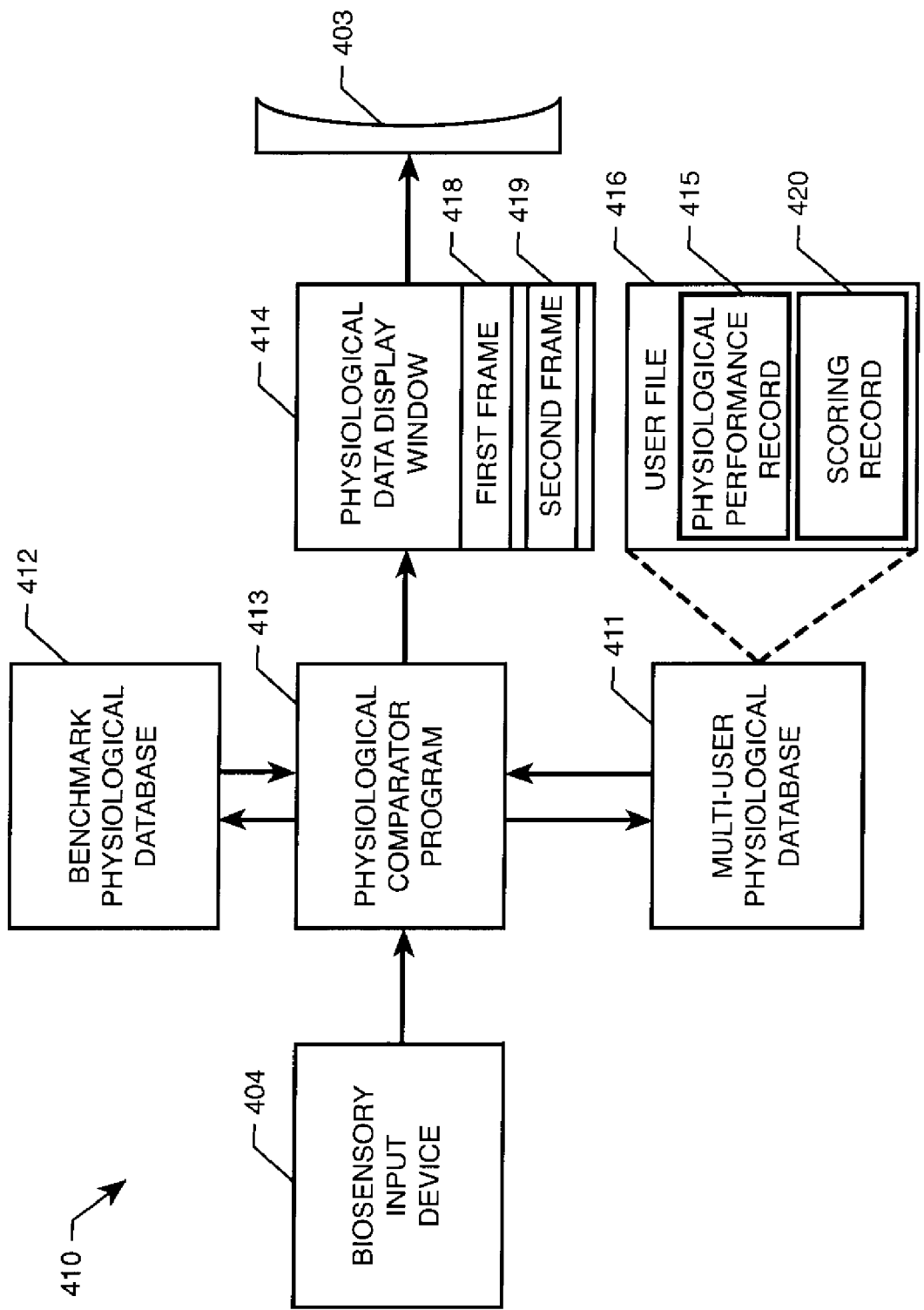
FIG. 2 is a schematic diagram of the physiological interface software of the invention.

FIG. 2 is a schematic diagram of physiological interface software 410 hosted by interactive device 400. Physiological interface software 410 interacts with MUVE-generating software 600 through network 200 and server 300 of FIG. 1 as described below.

Physiological interface software 410 comprises: benchmark physiological database 412 ("benchmark database"); multi-user physiological database 411 ("user database"); physiological comparator program 413 ("comparator program"); and, physiological data display window 414.

Physiological interface software 410 is programmed to cause detection and measurement of physiological functions by biosensory devices 404 of a user, such as exemplary user A participating in MUVE 800, in accordance with selectable modes of detection and measurement programmed into physiological user interface 410, which selectable modes of detection and measurement may, for example, comprise:

[i] a continuous detection and measurement mode, wherein biosensory device 404 outputs measured values of physiological functions to comparator program 413 as continuously measured values; and,

[ii] aperiodic detection and measurement mode, wherein biosensory device 404 outputs measured values of physiological functions to comparator program 413 as a periodically measured value; and,

[iii] average detection and measurement mode, wherein biosensory device 404 outputs measured values of physiological functions to comparator program 413, which measured values comprise a plurality of periodically measured values averaged over a predefined period of time.

In addition to receiving measured values of physiological functions from biosensory device 404, comparator program 413 is programmed to perform a variety of calculations based on the measured values of physiological functions it receives from biosensory device 404, productive of a set of measured physiological variables as follows:

[i] Comparator program 413 is programmed to receive as input from biosensory device 404 a first periodically measured value of a physiological function corresponding to a first time and a second periodically measured value of a physiological function corresponding to a second time, and to compute a measured change in value as the algebraic difference between the first periodically measured value and said second periodically measured value of the physiological function.

[ii] Comparator program 413 is further programmed to receive as input from biosensory device 404 a first periodically measured value of a physiological function corresponding to a first time and a second periodically measured value of a physiological function corresponding to a second time, and to compute an measured average rate of change in value as the algebraic difference between the first periodically measured value and said second periodically measured value of the physiological function divided by the difference between the first time and the second time.

[iii] Comparator program 413 is further programmed to receive as input from biosensory device 404 a continuously measured value of a physiological function and to compute a measured rate of change in value as the derivative with respect to time of the continuously measured value of the physiological function.

Summarizing, comparator program 413 receives as input from biosensory device 404, or uses input from biosensory device 404 to compute the following measured values of human physiological variables:
measured values;
measured average values,
measured change in values;
measured average rate of change in values;
measured rate of change in values.

Benchmark database 412 stores, permits access to, and maintains records of predefined values of human physiological functions, broadly classified under the headings "normal" and "target." Normal values of human physiological functions ("normal values") are normal values adjusted for such exemplary variables as age, gender, weight, height, and race that are expected of a user or group of users. Where normal values extend across ranges having upper and lower limits, they may be assigned a mean or average value for the normative range. Normal values are defined for populations of users.

Target values of human physiological functions ("target values") are desirable values of human physiological functions representing a goal required of a user or group of users. Target values may be artificially defined or defined on the basis of a baselining procedure for an individual competitor. That is, an individual's physiological performance during a game can be referenced to that individual's baseline physiological performance. In this instance, physiological measures are sampled while each individual competitor participates in a game-playing session during a baseline period of interaction in the MUVE when no influence based upon physiological signals is being applied. Baseline performance statistics of central tendency (e.g., mean) and of variability (e.g., standard deviation) are then computed. An individual's physiological performance baseline may be recalibrated at selected points during the participant's game-playing career. Associated with normal values, characterized by measures of central tendency such as population means, and target values, characterized by measures of central tendency such as individuals' baseline means or artificially defined values, are measures of variability such as standard deviations for populations or for an individual or artificially defined. A target physiological state obtains if all of the measured values of physiological functions indicating or defining the physiological state are within a predefined degree of statistical variability (e.g., standard deviation) from a statistical measure of central tendency (e.g., mean) from target values. An other than target physiological state obtains if any one of the measured values of physiological functions indicating or defining the physiological state are not within a predefined degree of statistical variability from a statistical measure of central tendency from target values.

Superior and inferior physiological states may be defined relative to target physiological states in the same way that superior and inferior physiological states are defined relative to normal physiological states.

A superior physiological state obtains if at least one of the measured values of physiological functions defining a target physiological state under a defined set of circumstances, has a supratarget value, or undergoes a supratarget change, or undergoes a supratarget rate of change, while all the remaining measured values of physiological functions that define the normal physiological state remain within a predefined degree of statistical variability from a statistical measure of central tendency for populations or for an individual or artificially defined. For example, a superior physiological state would obtain if the RR of a jogger did not rise as rapidly as expected for a given acceleration of the pace at which the jogger runs, based upon the jogger's baseline statistics.

Contrariwise, an inferior physiologic state obtains if at least one measured value of a physiological function of a set of measured values of physiological functions defining a target physiological state under a defined set of circumstances, has an infratarget value, or undergoes an infratarget change or undergoes an infratarget rate of change, while all the remaining measured values of physiological functions that define the normal physiological state remain within a predefined degree of statistical variability from a statistical measure of central tendency for populations or for an individual or artificially defined. For example, an inferior physiological state would obtain if the RR of a jogger failed to rise as rapidly as expected for a given acceleration of the pace at which the jogger runs, based upon the jogger's baseline statistics.

Additionally, for any defined time-dependent interaction with MUVE 800, such as, for example, hand-to-hand combat in a multi-user videogame embodiment of MUVE 800, or passage through a spacecraft's airlock in a multi-user computer-simulated task embodiment of MUVE 800, the following values are also predefined for each user, such as exemplary user A, by physiological software interface 410 and input by physiological software interface 410 to benchmark database 412:

[i] a normal change in value of a physiologic function ("normal change in value"), representing the normal change in value of a physiologic function over a predefined period of time; and,

[ii] a target change in value of a physiologic function ("normal change in value"), representing a desirable change in value of a physiologic function over a predefined period of time; and,

[iii] a normal average rate of change in value of any physiologic function ("normal rate of change in value"), representing the normal average rate of change in the value of a physiologic function over a predefined period of time; and,

[iv] a target average rate of change in value of any physiologic function ("target rate of change in value"), representing a desirable average rate of change in the value of a physiologic function over a predefined period of time; and,

[v] a normal rate of change in value of any physiologic function ("normal rate of change in value"), representing the normal rate of change in the value of a physiologic function at a predefined time; and,

[vi] a target rate of change in value of any physiologic function ("target rate of change in value"), representing a desirable rate of change in the value of a physiologic function at a predefined time.

Summarizing, benchmark database 412 stores, permits access to, and maintains records of the following predefined values of human physiological functions:

normal values;

target values;

normal average values;

target average values;

normal change in values;

target change in values;

normal average rate of change in values;

target average rate of change in values;

normal rate of change in values;

target rate of change in values; and, measures of variability such as standard deviations of said normal values and of said target values.

Comparator program 413, outputs measured physiological variables for any user, such as exemplary user A, to user database 411, which records the measured physiological variables to a user-identified, session-specific, record of physiologic performance 415 ("performance record"), shown in FIG. 2 as projecting from user database 411, established for each user, such as exemplary user A, for each session of participation in MUVE 800. User database 411 maintains each performance record 415 in a user-identified file 416 ("user file"), also shown in FIG. 2 as projecting from user database 411. User file 416 contains each performance record 415 generated by comparator program 413 in the course of each session of participation with MUVE 800 by each user. User file 416 additionally contains user-identified, session-specific, record of the score 420 of each user, such as exemplary user A.

Accordingly, in the course of any session with MUVE 800, using any selected mode of detection and measurement, such as, for example, the periodic mode of detection and measurement, and for each user participating in MUVE 800, such as exemplary user A:

a. Each biosensory device 404 operatively connected to exemplary user A detects and measures at least one physiological function and outputs to comparator program 413 a measured value of the physiological function ("measured value"); and, b. Upon receipt of the measured value, comparator program 413:

[i] searches benchmark database 412; and,

[ii] retrieves a corresponding normal value or target value and associated measure of variability for comparison with the measured value; and,

[iii] computes a difference-from-normal value as the algebraic difference between the measured value and the normal value, or computes a difference-from-target value as the algebraic difference between the measured value the target value; and,

[iv] computes a standardized value according to:

Standardized Value=Difference-from-normal Value/
Associated Measure of Variability of Normal
Population or Standardized Value=Difference-from-target Value/
Associated Measure of Variability of Individual.

c. Thereafter, comparator program 413 outputs each

[i] measured value, and its corresponding

[ii] normal value or target value, and its corresponding

[iii] difference-from-normal value or difference-from-target value, and its corresponding

[iv] measure of variability, and its corresponding

[v] standardized value to user database 411 for storage in performance record 415 within user file 416, maintained for each user, such as exemplary user A.

Figure 3:
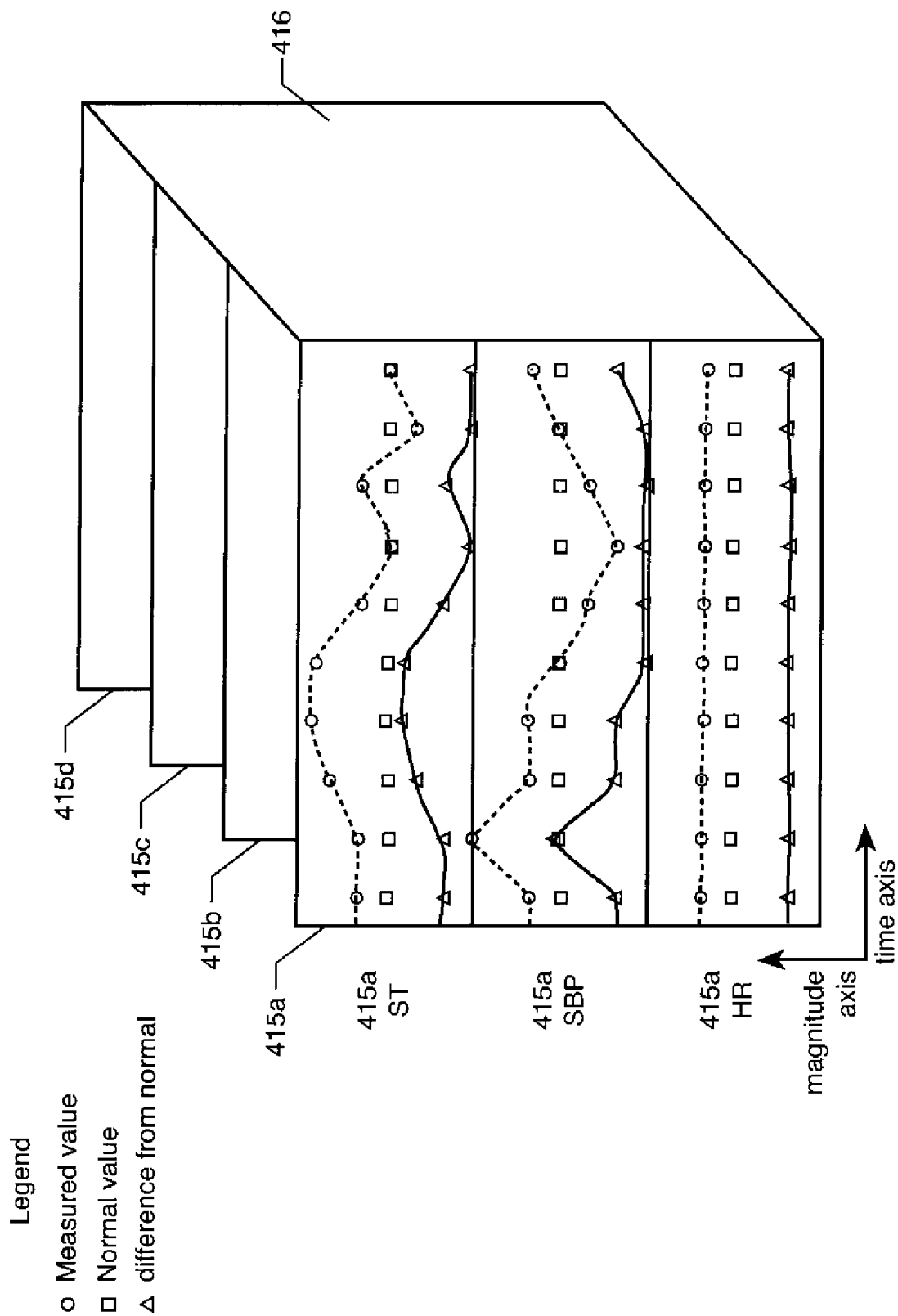
FIG. 3 is a schematic representation of an exemplary physiological performance record contained in an exemplary session-dependent physiological user file of the invention.

FIG. 3 is a perspective graphical representation of a user file 416 for exemplary user A, maintained in user database 411 that has accrued measured values, normal values, target values, difference-from-normal values, variability measures, and standardized values for exemplary sessions of participation in MUVE 800 by exemplary user A. In FIG. 3, user file 416 is depicted as a file folder in which a plurality of session-dependent performance records 415a, 415b, 415c, 415d, recorded for exemplary user A are depicted as sheets of paper. As oriented in FIG. 3, the right-hand face of each sheet of paper represents a performance record 415 for exemplary user A.

As shown in FIG. 3 for performance record 415a, each performance record may contain one or more data fields, such as exemplary data fields 415aST, 415aSBP, and 415aHR. Each exemplary data field 415aST, 415aSBP, and 415aHR respectively contains a graph of the measured value of an exemplary real-time physiological function, such as, for example, skin temperature ("ST"), shown in field 415aST, systolic blood pressure ("SBP"), shown in field 415aSBP, and heart rate ("HR"), shown in field 415aHR, as measured and output by biosensory device 404 to comparator program 413, together with a corresponding normal value and a measure of variability value, retrieved from benchmark database 412 by comparator program 413, and a difference-from-normal value, computed by comparator program 413, and a standardized value, computed by comparator program 413.

In FIG. 3, the vertical axis of each field 415aST, 415aSBP, and 415aHR is an ordinate representing the magnitude of a physiological function, such as HR, SBP and ST, respectively; and, the horizontal axis of each field 415aST, 415aSBP, and 415aHR is an abscissa representing elapsed time during a session in MUVE 800.

In each field 415aST, 415aSBP, and 415aHR in FIG. 3, graphs of measured values of physiological functions, such as ST (shown in field 415aST), SBP, (shown in field 415aSBP), and HR (shown in field 415aHR), are presented as lines joining circles.

In each field 415aST, 415aSBP, and 415aHR in FIG. 3, graphs of corresponding normal values of ST (shown in field 415aST), SBP (shown in field 415aSBP), and HR (shown in field 415aHR), are presented as lines joining "Xs".

And, in each field 415aST, 415aSBP, and 415aHR in FIG. 3, graphs of computed difference-from-normal or standardized values of ST (shown in field 415aST), SBP (shown in field 415aSBP) and HR (shown in field 415aHR) are presented as lines joining triangles.

Performance records 415 maintained in user file 416 for each user of MUVE 800, such as exemplary user A, are used by comparator program 413 to generate comparisons of the measured value ("M"), difference-from-normal value ("[M−N]"), difference-from-target value ("[M−T]"), measures of variability values, and standardized values of any physiological function with respect to which competition or cooperation among users in MUVE 800 is occurring.

By analogy with the computation of a difference-from-normal value ("[M−N]"), a difference-from-target value ("[M−T]"), a measure of variability value, and a standardized value for any user, such as exemplary user A, comparator program 413 is also programmed to compute derived measurements of physiological performance as follows:

a. Difference-from-Normal Average Value

[i] compute a measured average value ("Mavg") of a periodically measured physiological function by adding the values of a physiological function measured at a pre-defined number of times and dividing the sum by the number of measurements taken over the pre-defined time period; and,

[ii] retrieve from benchmark database 412 a corresponding normal average value for the physiological function ("Navg") and an associated measure of population variability that is expected of a user over the same time period; and, thereafter,

[iii] compute a difference-from-normal average value ("[Mavg−Navg]") reflecting the proximity of a user's measured average value to the normal average value; and,

[iv] compute a standardized value of the difference-from-normal average value or b. Difference-from-Target Average Value

[i] compute a measured average value ("Mavg") of a periodically measured physiological function by adding the values of a physiological function measured at a pre-defined number of times and dividing the sum by the number of measurements taken over the pre-defined time period; and,

[ii] retrieve from benchmark database 412 a corresponding target average value for the physiological function ("Tavg") and an associated measure of individual variability or a variability measure artificially defined that is demanded of a user over the same time period; and, thereafter,

[iii] compute a difference-from-target average value ("[Mavg−Tavg]") reflecting the proximity of a user's measured average value to the target average value; and,

[iv] compute a standardized value of the difference-from-target average value or c. Difference-from-Normal Change in Value

[i] compute a measured change in value ("ΔM") of a periodically measured physiological function by subtracting the value of the physiological function measured at a time T1 from the value of the physiological function measured at a time T2; and,

[ii] retrieve from benchmark database 412 a corresponding normal change in value for the physiological function ("ΔN") and an associated measure of population variability that is expected of a user over the same time period; and, thereafter,

[iii] compute a difference-from-normal change in value ("[ΔM−ΔN]") reflecting the proximity of a user's measured change in value to the normal change in value; and,

[iv] compute a standardized value of the difference-from-normal change in value; or d. Difference-from-Normal Target Change in Value

[i] compute a measured change in value ("ΔM") of a periodically measured physiological function by subtracting the value of the physiological function measured at a time T1 from the value of the physiological function measured at a time T2; and,

[ii] retrieve from benchmark database 412 a corresponding target change in value for the physiological function ("ΔT") and an associated measure of individual variability or a variability measure artificially defined that is demanded of a user over the same time period; and, thereafter,

[iii] compute a difference-from-target change in value ("[ΔM−ΔT]") reflecting the proximity of a user's measured change in value to the target change in value; and,

[iv] compute a standardized value of the difference-from-target change in value; or e. Difference-from-Normal Average Rate of Change

[i] compute an average rate of change in the measured value ("ΔM/Δt") of a periodically measured physiological function by subtracting the value of the physiological function measured at a time T1 from the value of the physiological function measured at a time T2 and dividing the difference by the time elapsed between T1 and T2; and,

[ii] retrieve from benchmark database 412 a corresponding normal average rate of change in value for the physiological function ("ΔN/Δt") and an associated measure of population variability that is expected of a user over the same time period; and, thereafter,

[iii] compute a difference-from-normal average rate of change in value ("[ΔM/Δt−ΔN/Δt]") reflecting the proximity of a user's measured average rate of change in value to the normal average rate of change in value; and,

[iv] compute a standardized value of the difference-from-normal average rate of change in value or, f. Difference-from-Target Average Rate of Change

[i] compute an average rate of change in the measured value ("ΔM/Δt") of a periodically measured physiological function by subtracting the value of the physiological function measured at a time T1 from the value of the physiological function measured at a time T2 and dividing the difference by the time elapsed between T1 and T2; and,

[ii] retrieve from benchmark database 412 a corresponding target average rate of change in value for the physiological function ("ΔT/Δt") and an associated measure of individual variability or a variability measure artificially defined that is demanded of a user over the same time period; and thereafter,

[iii] compute a difference-from-target average rate of change in value ("[ΔM/Δt−ΔN/Δt]") reflecting the proximity of a user's measured average rate of change in value to the target average rate of change in value; and,

[iv] compute a standardized value of the difference-from-target average rate of change in value; or g. Difference-from-Normal Rate of Change

[i] compute a rate of change in the measured value ("dM/dt") of a continuously measured physiological function by taking the derivative of the physiological function at a time T1; and,

[ii] retrieve from benchmark database 412 a corresponding normal rate of change in value for the physiological function ("dN/dt") and an associated measure of population variability that is expected of a user at the time T1; and, thereafter,

[iii] compute a difference-from-normal rate of change in value ("[dM/dt−dN/dt]") reflecting the proximity of a user's measured rate of change in value to the normal rate of change in value; and,

[iv] compute a standardized value of the difference-from-normal rate of change in value; or, h. Difference-from-Target Rate of Change

[i] compute a rate of change in the measured value ("dM/dt") of a continuously measured physiological function by taking the derivative of the physiological function at a time T1; and,

[ii] retrieve from benchmark database 412 a corresponding target rate of change in value for the physiological function ("dT/dt") and an associated measure of individual variability or a variability measure artificially defined that is demanded of a user at the time T1; and, thereafter,

[iii] compute a difference-from-target rate of change in value ("[dT/dt−dN/dt]") reflecting the proximity of a user's measured rate of change in value to the target rate of change in value; and,

[iv] compute a standardized value of the difference-from-target rate of change in value.

Table 1 summarizes the relationship among the foregoing computations. Column 1 shows the various measured physiological variables received or computed by comparator program 413. Columns 2 and 4 show the corresponding predefined normal and target values of physiological functions available from benchmark database 412 for comparison with the measured physiological variables of column 1. Columns 3 shows the difference-from-normal values arrived at by subtracting the various measured physiological variables of column 1 from the predefined normal values of column 2; column 5 shows the difference-from-target values arrived at by subtracting the various measured physiological variables of column 1 from the predefined target values of column 2; and column 6 shows the standardized values computed from either population statistics (normal) or individual statistics (target) or from statistics artificially defined (target).

TABLE 1

| 1 Measured Physiological Variables | 2 Predefined Normal Physiological Values | 3 Difference-from—Normal Values | 4 Predefined Target Physiological Values | 5 Difference-from—Target Values | 6 Standardized values |
|---|---|---|---|---|---|
| Measured value M | Normal value N | Difference-from—normal value (M − N) | Target value T | Difference-from—target value (M − T) | (M − N)/(Measure of population variability) or (M − T)/(Measure of individual variability) |
| Measured average value Mavg | Normal average value Navg | Difference-from—normal average value (Mavg − Navg) | Target average value Tavg | Difference-from—target average value (Mavg − Tavg) | (Mavg − Navg)/(Measure of population variability) or (Mavg − Tavg)/(Measure of individual variability) |

TABLE 1-continued

| 1 Measured Physiological Variables | 2 Predefined Normal Physiological Values | 3 Difference-from—Normal Values | 4 Predefined Target Physiological Values | 5 Difference-from—Target Values | 6 Standardized values |
|---|---|---|---|---|---|
| Measured change in value<br><br>ΔM | Normal change in value<br><br>ΔN | Difference-from—normal change in value (ΔM − ΔN) | Target change in value<br><br>ΔT | Difference-from—target change in value (ΔM − ΔT) | (ΔM − ΔN)/ (Measure of population variability) or (ΔM − ΔT)/ (Measure of individual variability) |
| Measured average rate of change in value<br><br>ΔM/Δt | Normal average rate of change in value<br><br>ΔN/Δt | Difference-from—normal-average change in value (ΔM/Δt − ΔN/Δt) | Target average rate of change in value<br><br>ΔT/Δt | Difference-from—target-average change in value (ΔM/Δt − ΔT/Δt) | (ΔM/Δt − ΔN/Δt)/ (Measure of population variability) or (ΔM/Δt − ΔT/Δt)/ (Measure of individual variability) |
| Measured rate of change in value<br><br>dM/dT | Normal rate of change in value<br><br>dN/dt | Difference-from—normal-change in value (dM/dt − dN/dt) | Target rate of change in value<br><br>dT/dt | Difference-from—target-change in value (dM/dt − dT/dt) | (dM/dt − dN/dt)/ (Measure of population variability) or (dM/dt − dT/dt)/ (Measurement of individual variability) |

Column 1 shows the various measured physiological variables received or computed by comparator program 413. Columns 2 and 4 show the corresponding predefined normal and target values of physiological functions available from benchmark database 412 for comparison with the measured physiological variables of column 1. Column 3 shows the difference-from-normal values arrived at by subtracting the various measured physiological variables of column 1 from the predefined normal values of column 2; column 5 shows the difference-from-target values arrived at by subtracting the various measured physiological variables of column 1 from the predefined target values of column 2; and column 6 shows the standardized values computed from either population statistics (normal) or individual statistics (target) or from statistics artificially defined (target).

For any user, such as exemplary user A, the set formed by the difference-from-normal values, difference-from-target values and standardized values comprises a physiological performance profile of the user.

Comparator program 413 compares the:
difference-from-normal values (M−N);
difference-from-target values (M−T);
difference-from-normal average values (Mavg−Navg);
difference-from-target average values (Mavg−Tavg);
difference-from-normal change in values (ΔN−ΔM);
difference-from-target change values (ΔN−ΔT);
difference-from-normal average rate-of-change in values (ΔM/Δt−ΔN/Δt);
difference-from-target average rate-of-change in values (ΔM/Δt−ΔT/Δt);
difference-from-normal rate-of-change in values (dM/dt−dN/dt);
difference-from-target rate-of-change in values (dM/dt−dT/dt); and standardized values for each of said difference values of each user (collectively "difference values" and standardized values), such as exemplary user A, to give each user a relative advantage or handicap in his or her participation in MUVE 800 by interacting with each users' input devices 404 and/or directly influencing the score by which each user's performance in MUVE 800 is graded.

Comparator program 413 utilizes each user's
difference-from-normal values,
difference-from-normal average values,
difference-from-normal change in values,
difference-from-normal average rate-of-change in values, and,
difference-from-normal rate-of-change in values,
to influence each user's participation in MUVE 800, to encourage self-regulation of physiological performance, and to foster competition in biofeedback-mediated physiological self-mastery in accordance with the following scoring logic.

For any defined interaction with MUVE 800, such as, for example, an episode of hand-to-hand combat in a multi-user videogame embodiment of MUVE 800, or passage through a spacecraft's airlock in a multi-user computer-simulated task embodiment of MUVE 800, a normal value,
normal average value,
normal change in value,
normal average rate of change in value, or
normal rate of change in value,
and the measure of variability associated with the said normal values,
for one or more physiological functions of interest (collectively "corresponding normal benchmarks") may be pre-defined for each user, such as exemplary user A, and input to benchmark database 412.

If with respect to each of the corresponding normal benchmarks, exemplary user A's
difference-from-normal values,
difference-from-normal average values,
difference-from-normal change in values,
difference-from-normal average rate-of-change in values, or
difference-from-normal rate-of-change in values,
are about equal to zero, then the control by exemplary user A of his avatar A' by means of input device 402 is unaffected and, there is no contribution to A's score or to A's capability and no contribution to the score of any other user, or any combination of these consequences, made in MUVE 800 by physiological interface software 410.

If with respect to each of the corresponding normal benchmarks, any one of exemplary user A's
difference-from-normal values,
difference-from-normal average values,
difference-from-normal change in values,
difference-from-normal average rate-of-change in values, or
difference-from-normal rate-of-change in values
is supranormal, as defined hereinabove, then control by exemplary user A of his avatar A' by means of input device 402 is made easier in accordance with the method and apparatus disclosed in U.S. Pat. No. 6,450,820 issued to Palsson, et al., on Sep. 17, 2002, entitled, "Method and Apparatus for Encouraging Physiological Self-Regulation through Modulation of an Operator's Control Input to a Video Game or Training Simulator," which is incorporated herein by reference as if set forth in its entirety; or, there is an addition of at least one performance point to A's score, or an addition of at least one power-up element to A's capability, or a subtraction of performance points from the scores of all other users, or an addition of at least one power-down element to the capabilities of all other users, or any combination of these consequences, effected in MUVE 800 by physiological interface software 410.

The degree to which the control by exemplary user A of his avatar A' by means of input device 402 is made easier may be made proportional to a functional combination of the standardized values of the above difference values. The standardized value of each of the difference values is computed from the measured value, the corresponding normal benchmark value, and the associated measure of variability according to:

Standardized Value=(Measured Value−Corresponding Normal Benchmark Value)/(Associated Measure of Variability)

The number of performance points added to A's score, and the number of power-up elements added to A's capability, and the number of performance points subtracted from the scores of all other users, and the number of power-down elements added to the capabilities of all other users may each be made proportional to a functional combination of the above defined standardized values of the difference values.

If with respect to each of the normal benchmarks, any one of exemplary user A's difference-from-normal values,
difference-from-normal average values,
difference-from-normal change in values,
difference-from-normal average rate-of-change in values, or
difference-from-normal rate-of-change in values
is infranormal, as defined hereinabove, then the control by exemplary user A of his avatar A' by means of input device 402 is made more difficult in accordance with the method and apparatus disclosed in U.S. Pat. No. 6,450,820 issued to Palsson, et al. on Sep. 17, 2002, entitled, "Method and Apparatus for Encouraging Physiological Self-Regulation through Modulation of an Operator's Control Input to a Video Game or Training Simulator," which is incorporated herein by reference as if set forth in its entirety; or, there is a subtraction of at least one performance point from A's score, or the addition of at least one power-down element to A's capability, or an addition of performance points to the scores of all other users, or an addition of at least one power-up element to the capabilities of all other users, or any combination of these consequences, effected in MUVE 800 by physiological interface software 410.

The degree to which the control by exemplary user A of his avatar A' by means of input device 402 is made more difficult may be made proportional to a functional combination of the standardized values of the above difference values. The standardized value of each of the difference values is computed from the measured value, the corresponding normal benchmark value and the associated measure of variability according to:

Standardized Value=(Measured Value−Associated Benchmark Value)/(Associated Measure of Variability)

The number of performance points subtracted from A's score, and the number of power-down elements added to A's capability, and the number of performance points added to the scores of all other users and the number of power-up elements added to the capabilities of all other users may each be made proportional to a functional combination of the above defined standardized values of the difference values.

Physiological comparator program 413 utilizes each user's
difference-from-target values,
difference-from-target average values,
difference-from-target change in values,
difference-from-target average rate-of-change in values, or
difference-from-target rate-of-change in values
to influence participation in MUVE 800, to encourage self-regulation of physiological performance, and to foster competition in biofeedback-mediated physiological self-mastery as follows.

For any defined interaction with MUVE 800, such as, for example, an episode of hand-to-hand combat in a multi-user videogame embodiment of MUVE 800, or passage through a spacecraft's airlock in a multi-user computer-simulated task embodiment of MUVE 800, a target value,
target average value,
target change in value,
target average rate of change in value, or
target rate of change in value, and
the measure of variability associated with the above value, for one or more physiological functions of interest (collectively "targeted benchmarks") may be pre-defined for each user, such as exemplary user A, and input to benchmark database 412.

If with respect to each of the targeted benchmarks, exemplary user A's
difference-from-target values,
difference-from-target average values,
difference-from-target change in values,
difference-from-target average rate-of-change in values, or
difference-from-target rate-of-change in values
are about equal to zero, then control by exemplary user A of his avatar A' by means of input device 402 is unaffected and, there is no contribution to A's scoring or to A's capability and no contribution to the scoring of all other users, or any combination of these consequences, effected in MUVE 800 by physiological interface software 410.

If with respect to each of the targeted benchmarks, any one of exemplary user A's
difference-from-target values,
difference-from-target average values,
difference-from-target change in values,
difference-from-target average rate-of-change in values, or
difference-from-target rate-of-change in values
is supratarget, as defined hereinabove, then the control by exemplary user A of his avatar A' by means of input device 402 is made easier in accordance with the method and apparatus disclosed in U.S. Pat. No. 6,450,820 issued to Palsson, et al., on Sep. 17, 2002, entitled, "Method and Apparatus for Encouraging Physiological Self-Regulation through Modulation of an Operator's Control Input to a Video Game or Training Simulator," which is incorporated herein by reference as if set forth in its entirety; or, there is an addition of at least one performance point to A's score or the addition of at least one power-up element A's capability, or a subtraction of performance points from the scores of all other users, or an addition of at least one power-down element to the capabilities of all other users, or any combination of these consequences, effected in MUVE 800 by physiological interface software 410.

The degree to which the control by exemplary user A of his avatar A' by means of input device 402 is made more difficult may be made proportional to a functional combination of the standardized values of the above difference values. The standardized value of each of the difference values is computed from the measured value, the corresponding target benchmark value and the associated measure of variability according to:

Standardized Value=(Measured Value−Associated Benchmark Value)/(Associated Measure of Variability)

The number of performance points subtracted from A's score, and the number of power-down elements added to A's capability, and the number of performance points added to the scores of all other users and the number of power-up elements added to the capabilities of all other users may each be made proportional to a functional combination of the above defined standardized values of the difference values.

If with respect to each of the targeted benchmarks, any one of exemplary user A's
difference-from-target values,
difference-from-target average values,
difference-from-target change in values,
difference-from-target average rate-of-change in values, or
difference-from-target rate-of-change in values
is infratarget, as defined hereinabove, then the control by exemplary user A of his avatar A' by means of input device 402 is made more difficult in accordance with the method and apparatus disclosed in U.S. Pat. No. 6,450,820 issued to Palsson, et al., on Sep. 17, 2002, entitled, "Method and Apparatus for Encouraging Physiological Self-Regulation through Modulation of an Operator's Control Input to a Video Game or Training Simulator," which is incorporated herein by reference as if set forth in its entirety; or, there is a subtraction of at least one performance point from A's score or an addition of at least one power-down element to A's capability, or the addition of performance points to the scores of all other users, or an addition of at least one power-up element to the capabilities of all other users, or any combination of these consequences, effected in MUVE 800 by physiological interface software 410.

The degree to which the control by exemplary user A of his avatar A' by means of input device 402 is made more difficult may be made proportional to a functional combination of the standardized values of the above difference values. The standardized value of each of the difference values is computed from the measured value, the corresponding target benchmark value and the associated measure of variability according to:

Standardized Value=(Measured Value−Associated Benchmark Value)/(Associated Measure of Variability)

The number of performance points subtracted from A's score, and the number of power-down elements added to A's capability, and the number of performance points added to the scores of all other users and the number of power-up elements added to the capabilities of all other users may each be made proportional to a functional combination of the above defined standardized values of the difference values.

In all of the foregoing examples, the contributions of positive performance points may comprise a numerical point increase in a user's score, or may comprise a gain in some element of the MUVE, i.e., a "power-up element," that contributes to further success, such as, for example, the accrual of virtual fuel, food, ammunition, energy, longevity, shielding; or the augmentation of some virtual power, capability or function of a user's avatar that also contributes to further success, such as, for example, extended range motion, or augmented effect of motion, or extended duration of activity. Contrariwise, the negative contributions may be a numerical point decrease; or, a gain in a negative element of the MUVE, i.e., a "power-down element," that detracts from further success, or diminished virtual power, capability or function of a user's avatar that also detracts from further success.

Accordingly, in light of the foregoing, physiological interface software 410 may be programmed to determine the success of one user relative to another user, or to determine the success of teams of users relative other teams of users, or to determine which user or teams of users qualify for access to another hierarchical level of MUVE 800.

Physiological interface software 410 may also be programmed such that performance points may be combined or exchanged among users. For example, upon attaining a pre-defined threshold score a user may choose to aid one or more a physiologically weaker allies, and may donate performance points from his score to the score of other users interacting with MUVE 800, thereby decreasing his score by the number of performance points so donated. Alternatively, upon attaining a pre-defined threshold score, a user may choose to weaken one or more adversaries, and may withdraw performance points from the score of other users interacting with MUVE 800, thereby augmenting his user's score by the number of performance points so withdrawn.

As shown in FIG. 2, during any session in MUVE 800, comparator program 413 records the score of each user, such as exemplary user A, as influenced by the foregoing scoring logic, to user-identified, session-specific record of score 420, and to a first frame 418 established within physiological data display window 414. As shown in FIG. 2, during any session in MUVE 800, comparator program 413 records the measured physiological variables of each user such as exemplary user A to a user-identified, session-specific, record of physiologic performance 415 and records the physiological performance profile of the user to a second frame 419 established within physiological data display window 414. First frame 418 and second frame 419 appearing in physiological data display window 414 for each user, such as exemplary user A, are caused to appear on output devices 403 of all users participating in MUVE 800 in the following selectable display modes:

In the default "novice" mode of display, physiological data display window 414, appears on output devices 403 of exemplary user A, wherein it displays first frame 418 and second frame 419 of exemplary user A and first frame 418 and second frame 419 of every other user participating in MUVE 800. All other users also see physiological data display window 414 on their respective output devices 403, wherein it displays their own first frame 418 and second frame 419, the first frame 418 and second frame 419 of A, and the first frame 418 and second frame 419 of every other user participating in the MUVE 800.

In the "advanced" mode of display, physiological data display window 414, appears on output devices 403 of exemplary user A, wherein it displays first frame 418 and second frame 419 of exemplary user A and first frame 418 and second frame 419 of every other user participating in the MUVE 800. All other users also see physiological data display window 414 on their respective output devices 403, wherein it displays their first frame 418 and second frame 419, and first frame 418 and second frame 419 of every other user participating in the MUVE 800, except that of exemplary user A. Advanced mode display of physiological data display window 414 effectively blinds other users participating in the MUVE 800 from exemplary user A's own score and physiological performance profile, while making all other user's scores and physiological performance profiles visible to exemplary user A.

In the "expert" mode of display, physiological data display window 414, appears on output devices 403 of exemplary user A, wherein it displays first frame 418 and second frame 419 of exemplary user A and first frame 418 and second frame 419 of every other user participating in the MUVE 800. All other users also see physiological data display window 414 on their respective output devices 403, wherein it displays first frame 418 and second frame 419 of every other user participating in the MUVE 800, except first frame 418 and second frame 419 of exemplary user A and first frame 418 and second frame 419 of any other user selected by exemplary user A for non-display. Expert mode display of physiological data display window 414 effectively blinds other users participating in the MUVE 800 from exemplary user A's own score and physiological performance profile, as well the scores and physiological performance profiles of all users selected by A, while making the score and physiological performance profile of each other user visible to exemplary user A.

The competitive advantage offered to a user, such as exemplary user A, by access to the "advanced" mode or the "expert" mode of display of physiological data display window 414, may be earned, for example, by the attainment of a threshold score or by the attainment of a predetermined physiologic performance benchmark set by either comparator program 413 or by A, or by consensus among the users participating in the MUVE 800.

At any time during session in MUVE 800, a user, such as exemplary user A, may save an earned "advanced" or "expert" mode of display of physiological data display window 414, and revert to the default mode of display of physiological data display window 414. Entering a code can later retrieve the earned "advanced" or "expert" modes of display.

For any user, such as exemplary user A, the set formed by the combination of: the difference-from-normal values, difference-from-target values and standardized values computed by comparator program 413, and recorded to physiological performance record 415 comprises a physiological performance profile of the user.

The physiological performance record 415 accrued in the course of a session in MUVE 800 by exemplary user A can subsequently be accessed by physiological interface software 410 or another user. For example, the physiological performance record 415 of exemplary user A in the course of a session in MUVE 800 may subsequently be assigned to another "assignee" avatar whose behavior in MUVE 800 is thereafter determined and controlled by physiological interface software 410 utilizing exemplary user A's performance record 415, and A's avatar may be activated while exemplary user A is not participating in MUVE 800. The assignee avatar assumes the recorded physiological performance of exemplary user A, and emulates exemplary user A's recorded physiological reactions to certain events occurring in MUVE 800, such as parrying a sword thrust, thereby, effectively serving as a "ghost" of exemplary user A with which other users of the MUVE may interact in the absence of exemplary user A's actual participation in MUVE 800.

The descriptions of the present invention represent the invention in its current embodiment as practical application has been achieved in the lab environment. It should be understood that additional changes in the details, materials, process steps, and part arrangement may be made by those skilled in the art within the principle and scope of the invention as expressed in the appended claims. Although the invention has been described relative to a specific embodiment, there are numerous variations and modifications that will be readily apparent to those skilled in the art in light of the above teachings. It is therefore to be understood that, within the scope of the appended claims, the invention may be practiced other than as specifically described.

The invention claimed is:

1. A physiological user interface comprising a software-generated multi-user virtual environment ("MUVE"), said MUVE being generated on non-transitory computer-readable media, wherein a user among a plurality of users interacts with said MUVE through an output of at least one biosensory device operatively connected to said user, said output contributing to a score of said user's interaction with said MUVE; wherein said at least one biosensory device communicates with an interactive device hosting physiological interface software, said interactive device comprising a local computing device operatively connected to at least one input device and at least one output device, said interactive device further interacting with one server hosting software generative of said MUVE; wherein said at least one input device controls actions of an avatar representative of said user in said MUVE, said actions of said avatar contributing to a first component of said score of said user's interaction with said MUVE; wherein said output of said at least one biosensory device operatively connected to said user comprises a signal encoding a measured value of at least one physiological function of said user, said measured value contributing to a second component of said score of said user's interaction with said MUVE; wherein there accrues to said avatar an assignable physiological performance record of said user represented by said avatar comprising at least one of: said measured values; and a performance profile of said user comprising at least one of: difference-from-normal values; difference-from-target values; and standardized values; and wherein said physiological interface software comprises a physiological comparator program; a multi-user physiological database; a benchmark physiological database; and a physiological data display window caused to be displayed on said at least one output device by said physiological interface software in accordance with a selectable display mode, said physiological data display window containing a first frame for said user's physiological performance, wherein there may be displayed said score of said user's interaction with said MUVE and a score of each other user interacting with said MUVE, said physiological data display window further containing a second frame for said user's physiological performance, wherein there may be displayed said physiological performance profile of said user and a physiological performance profile for each other user interacting with said MUVE.

2. The physiological user interface of claim 1, wherein said avatar's physiological performance record may be assigned by said physiological interface software to an assignee avatar whose behavior in said MUVE is thereafter determined and controlled independently of said user by said physiological interface software utilizing said physiological performance record.

3. The physiological user interface of claim 1, wherein said score is comprised of performance points, power-up elements and power-down elements.

4. The physiological user interface of claim 3, wherein, upon attaining a threshold score, said user may command said physiological interface software to selectably donate performance points from said user's score to said score of each other user interacting with said MUVE, thereby decreasing said user's score by the number of performance points so donated.

5. The physiological user interface of claim 3, wherein, upon attaining a threshold score, said user may command said physiological interface software to selectably withdraw performance points from said score of each other user interacting with said MUVE, thereby increasing said user's score by the number of performance points so withdrawn.

6. The physiological user interface of claim 3, wherein said benchmark physiological data base receives as input, stores, maintains and outputs predefined values of human physiological functions, comprising at least one of: normal values; target values artificially defined; target values based on an individual's baseline physiological response; normal changes in values; target changes in values artificially defined; target changes in values based on an individual's baseline physiological response; normal rates of change in values; target rates of change in values artificially defined; target rates of change in values based on an individual's baseline physiological responses; and measures of variability of said normal values and of said target values.

7. The physiological user interface of claim 5, wherein said physiological comparator program receives as input from said biosensory device said measured value of at least one physiological function of said user, said measured value being encoded in said output of said at least one biosensory device upon detection and measurement of said at least one physiological function of said user by said at least one biosensory device in accordance with a selectable mode of detection and measurement.

8. The physiological user interface of claim 7, wherein said selectable mode of detection and measurement by said at least one biosensory device comprises a periodic detection and measurement mode, said at least one biosensory device outputting said measured value of said at said least one physiological function to said physiological comparator program as a periodically measured value.

9. The physiological user interface of claim 8, wherein said physiological comparator program receives as input from said at least one biosensory device a first periodically measured value corresponding to a first time and a second periodically measured value corresponding to a second time, and computes a measured change in value as the algebraic difference between said first periodically measured value and said second periodically measured value.

10. The physiological user interface of claim 9, wherein following computation of said measured change in value, said physiological comparator program obtains as input from said benchmark physiological database a normal change in value and measure of variability of the normal change in value for a user population of said at least one physiological function measured by said measured value, and computes a difference-from-normal change in value and a standardized value computed from (standardized value)=(difference-from-normal change in value)/(measure of variability of the normal change in value for a user population), outputting said measured change in value, said normal change in value, said difference-from-normal change in value, and said standardized value to a record of physiologic performance disposed in a file established for said user in said multi-user physiological database; and, further outputting said difference-from-normal change in value, and said standardized value to said physiological data display window for display in said second frame for said user's physiological performance.

11. The physiological user interface of claim 10, wherein if either said difference-from-normal change in value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software; said score is made to appear in said first frame for said user's physiologic performance contained in said physiological data display window by said physiological interface software; and, if said difference-from-normal change in value computed by said physiological comparator program for said user is supranormal or if said standardized value computed by said physiological comparator program for said user is greater than a predefined value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological user interface, and said score is made to appear in said first frame for said user's physiologic performance contained in said physiological data display window by said physiological user interface; and, if said difference-from-normal change in value computed by said physiological comparator program for said user is infranormal, or if said standardized value computed by said physiological comparator program for said user is less than a predefined value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological user interface, and said score is made to appear in said first frame for said user's physiologic performance contained in said physiological data display window by said physiological user interface.

12. The physiological user interface of claim 9, wherein following computation of said measured change in value, said physiological comparator program obtains as input from said benchmark physiological database a target change in value and measure of variability of the target change in value for a user population of said at least one physiological function measured by said measured value, and computes a difference-from-target change in value and a standardized value computed from (standardized value)=(difference-from-target change in value)/(measure of variability of the target change in value for a user population), outputting said measured change in value, said target change in value, said difference-from-target change in value, and said standardized value to a record of physiologic performance disposed in a file established for said user in said multi-user physiological database; and, further outputting said difference-from-target change in value, and said standardized value to said physiological data display window for display in said second frame for said user's physiological performance.

13. The physiological user interface of claim 12, wherein if either said difference-from-target change in value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software; said score is made to appear in said first frame for said user's physiologic performance contained in said physiological data display window by said physiological interface software; and, if said difference-from-target change in value computed by said physiological comparator program for said user is supratarget or if said standardized value computed by said physiological comparator program for said user is greater than a predefined value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological user interface, and said score is made to appear in said first frame for said user's physiologic performance contained in said physiological data display window by said physiological user interface; and, if said difference-from-target change in value computed by said physiological comparator program for said user is infratarget, or if said standardized value computed by said physiological comparator program for said user is less than a predefined value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological user interface, and said score is made to appear in said first frame for said user's physiologic performance contained in said physiological data display window by said physiological user interface.

14. The physiological user interface of claim 8, wherein said physiological comparator program receives as input from said at least one biosensory device a first periodically measured value corresponding to a first time and a second periodically measured value corresponding to a second time, and computes a measured average rate of change in value as the algebraic difference between said first periodically measured value and said second periodically measured value divided by the time elapsed from said first time to said second time.

15. The physiological user interface of claim 14, wherein following computation of said measured average rate of change in value, said physiological comparator program obtains as input from said benchmark physiological database a normal average rate of change in value and measure of variability of the normal average rate of change in value for a user population of said at least one physiological function measured by said measured value, and computes a difference-from-normal average rate of change in value and a standardized value computed from (standardized value)=(difference-from-normal average rate of change in value)/(measure of variability of the normal average rate of change in value for a user population), outputting said measured average rate of change in value, said normal average rate of change in value, said difference-from-normal average rate of change in value, and said standardized value to a record of physiologic performance disposed in a file established for said user in said multi-user physiological database; and, further outputting said difference-from-normal average rate of change in value, and said standardized value to said physiological data display window for display in said second frame for said user's physiological performance.

16. The physiological user interface of claim 15, wherein if either said difference-from-normal average rate of change in value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software; said score is made to appear in said first frame for said user's physiologic performance contained in said physiological data display window by said physiological interface software; and, if said difference-from-normal average rate of change in value computed by said physiological comparator program for said user is supranormal or if said standardized value computed by said physiological comparator program for said user is greater than a predefined value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological user interface, and said score is made to appear in said first frame for said user's physiologic performance contained in said physiological data display window by said physiological user interface; and, if said difference-from-normal average rate of change in value computed by said physiological comparator program for said user is infranormal, or if said standardized value computed by said physiological comparator program for said user is less than a predefined value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological user interface, and said score is made to appear in said first frame for said user's physiologic performance contained in said physiological data display window by said physiological user interface.

17. The physiological user interface of claim 14, wherein following computation of said measured average rate of change in value, said physiological comparator program obtains as input from said benchmark physiological database a target average rate of change in value and measure of variability of the target average rate of change in value for a user population of said at least one physiological function measured by said measured value, and computes a difference-from-target average rate of change in value and a standardized value computed from (standardized value)=(difference-from-target average rate of change in value)/(measure of variability of the target average rate of change in value for a user population), outputting said measured average rate of change in value, said target average rate of change in value, said difference-from-target average rate of change in value, and said standardized value to a record of physiologic performance disposed in a file established for said user in said multi-user physiological database; and, further outputting said difference-from-target average rate of change in value, and said standardized value to said physiological data display window for display in said second frame for said user's physiological performance.

18. The physiological user interface of claim 17, wherein if either said difference-from-target average rate of change in value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software; said score is made to appear in said first frame for said user's physiologic performance contained in said physiological data display window by said physiological interface software; and, if said difference-from-target average rate of change in value computed by said physiological comparator program for said user is supratarget or if said standardized value computed by said physiological comparator program for said user is greater than a predefined value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological user interface, and said score is made to appear in said first frame for said user's physiologic performance contained in said physiological data display window by said physiological user interface; and, if said difference-from-target average rate of change in value computed by said physiological comparator program for said user is infratarget, or if said standardized value computed by said physiological comparator program for said user is less than a predefined value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological user interface, and said score is made to appear in said first frame for said user's physiologic performance contained in said physiological data display window by said physiological user interface.

19. The physiological user interface of claim 7, wherein said selectable mode of detection and measurement by said at least one biosensory device comprises a continuous detection and measurement mode, said at least one biosensory device outputting said measured value of at least one physiological function to said physiological comparator program as a continuously measured value.

20. The physiological user interface of claim 19, wherein said physiological comparator program receives as input from said at least one biosensory device a continuously measured value and computes a measured rate of change in value as the derivative with respect to time of said continuously measured value.

21. The physiological user interface of claim 20, wherein following computation of said measured rate of change in value, said physiological comparator program obtains as input from said benchmark physiological database a normal rate of change in value and measure of variability of the normal rate of change in value for a user population of said at least one physiological function measured by said measured value, and computes a difference-from-normal rate of change in value and a standardized value computed from (standardized value)=(difference-from-normal rate of change in value)/(measure of variability of the normal rate of change in value for a user population), outputting said measured rate of change in value, said normal rate of change in value, said difference-from-normal rate of change in value, and said standardized value to a record of physiologic performance disposed in a file established for said user in said multi-user physiological database; and, further outputting said difference-from-normal rate of change in value, and said standardized value to said physiological data display window for display in said second frame for said user's physiological performance.

22. The physiological user interface of claim 21, wherein if either said difference-from-normal rate of change in value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software; said score is made to appear in said first frame for said user's physiologic performance contained in said physiological data display window by said physiological interface software; and, if said difference-from-normal rate of change in value computed by said physiological comparator program for said user is supranormal or if said standardized value computed by said physiological comparator program for said user is greater than a predefined value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological user interface, and said score is made to appear in said first frame for said user's physiologic performance contained in said physiological data display window by said physiological user interface; and, if said difference-from-normal rate of change in value computed by said physiological comparator program for said user is infranormal, or if said standardized value computed by said physiological comparator program for said user is less than a predefined value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological user interface, and said score is made to appear in said first frame for said user's physiologic performance contained in said physiological data display window by said physiological user interface.

23. The physiological user interface of claim 20, wherein following computation of said measured rate of change in value, said physiological comparator program obtains as input from said benchmark physiological database a target rate of change in value and measure of variability of the target rate of change in value for a user population of said at least one physiological function measured by said measured value, and computes a difference-from-target rate of change in value and a standardized value computed from (standardized value)=(difference-from-target rate of change in value)/(measure of variability of the target rate of change in value for a user population), outputting said measured rate of change in value, said target rate of change in value, said difference-from-target rate of change in value, and said standardized value to a record of physiologic performance disposed in a file established for said user in said multi-user physiological database; and, further outputting said difference-from-target rate of change in value, and said standardized value to said physiological data display window for display in said second frame for said user's physiological performance.

24. The physiological user interface of claim 23, wherein if either said difference-from-target rate of change in value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software; said score is made to appear in said first frame for said user's physiologic performance contained in said physiological data display window by said physiological interface software; and, if said difference-from-target rate of change in value computed by said physiological comparator program for said user is supratarget or if said standardized value computed by said physiological comparator program for said user is greater than a predefined value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological user interface, and said score is made to appear in said first frame for said user's physiologic performance contained in said physiological data display window by said physiological user interface; and, if said difference-from-target rate of change in value computed by said physiological comparator program for said user is infratarget, or if said standardized value computed by said physiological comparator program for said user is less than a predefined value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological user interface, and said score is made to appear in said first frame for said user's physiologic performance contained in said physiological data display window by said physiological user interface.

25. The physiological user interface of claim 7, wherein said selectable mode of detection and measurement by said at least one biosensory device comprises an average detection and measurement mode, said at least one biosensory device outputting said measured value of at least one physiological function to said physiological comparator program as a plurality of periodically measured values averaged over a predefined period of time.

26. The physiological user interface of claim 25, wherein upon receipt of said measured average value, said physiological comparator program obtains as input from said benchmark physiological database a normal average value and measure of variability of the normal average value for a user population of said at least one physiological function measured by said measured value, and computes a difference-from-normal average value and a standardized value computed from (standardized value)=(difference-from-normal average value)/(measure of variability of the normal average value for a user population), outputting said measured average value, said normal average value, said difference-from-normal average value, and said standardized value to a record of physiologic performance disposed in a file established for said user in said multi-user physiological database; and, further outputting said difference-from-normal average value, and said standardized value to said physiological data display window for display in said second frame for said user's physiological performance.

27. The physiological user interface of claim 26, wherein if either said difference-from-normal average value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software; said score is made to appear in said first frame for said user's physiologic performance contained in said physiological data display window by said physiological interface software; and, if said difference-from-normal average value computed by said physiological comparator program for said user is supranormal or if said standardized value computed by said physiological comparator program for said user is greater than a predefined average value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological user interface, and said score is made to appear in said first frame for said user's physiologic performance contained in said physiological data display window by said physiological user interface; and, if said difference-from-normal average value computed by said physiological comparator program for said user is infranormal, or if said standardized value computed by said physiological comparator program for said user is less than a predefined average value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological user interface, and said score is made to appear in said first frame for said user's physiologic performance contained in said physiological data display window by said physiological user interface.

28. The physiological user interface of claim 25, wherein upon receipt of said measured average value, said physiological comparator program obtains as input from said benchmark physiological database a target average value and measure of variability of the target average value for a user population of said at least one physiological function measured by said measured value, and computes a difference-from-target average value and a standardized value computed from (standardized value)=(difference-from-target average value)/(measure of variability of the target average value for a user population), outputting said measured average value, said target average value, said difference-from-target average value, and said standardized value to a record of physiologic performance disposed in a file established for said user in said multi-user physiological database; and, further outputting said difference-from-target average value, and said standardized value to said physiological data display window for display in said second frame for said user's physiological performance.

29. The physiological user interface of claim 28, wherein if either said difference-from-target average value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software, said score is made to appear in said first frame for said user's physiologic performance contained in said physiological data display window by said physiological interface software; and, if said difference-from-target average value computed by said physiological comparator program for said user is supratarget or if said standardized value computed by said physiological comparator program for said user is greater than a predefined average value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological user interface, and said score is made to appear in said first frame for said user's physiologic performance contained in said physiological data display window by said physiological user interface; and, if said difference-from-target average value computed by said physiological comparator program for said user is infratarget, or if said standardized value computed by said physiological comparator program for said user is less than a predefined average value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological user interface, and said score is made to appear in said first frame for said user's physiologic performance contained in said physiological data display window by said physiological user interface.

30. The physiological user interface of claim 7, wherein upon receipt of said measured value from said at least one biosensory device, said physiological comparator program obtains as input from said benchmark physiological database a normal value and measure of variability of the normal value for a user population of said at least one physiological function measured by said measured value, and computes a difference-from-normal value and a standardized value computed from (standardized value)=(difference-from-normal value)/(measure of variability of the normal value for a user population), outputting said measured value, said normal value, said difference-from-normal value, and said standardized value to a record of physiologic performance disposed in a file established for said user in said multi-user physiological database; and, further outputting said difference-from-normal value, and said standardized value to said physiological data display window for display in said second frame for said user's physiological performance.

31. The physiological user interface of claim 30, wherein if either said difference-from-normal value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software; said score is made to appear in said first frame for said user's physiologic performance contained in said physiological data display window by said physiological interface software; and, if said difference-from-normal value computed by said physiological comparator program for said user is supranormal or if said standardized value computed by said physiological comparator program for said user is greater than a predefined value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological interface software, and said score is made to appear in said first frame for said user's physiologic performance contained in said physiological data display window by said physiological interface software; and, if said difference-from-normal value computed by said physiological comparator program for said user is infranormal, or if said standardized value computed by said physiological comparator program for said user is less than a predefined value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological interface software, and said score is made to appear in said first frame for said user's physiologic performance contained in said physiological data display window by said physiological interface software.

32. The physiological user interface of claim 7, wherein upon receipt of said measured value from said at least one biosensory device, said physiological comparator program obtains as input from said benchmark physiological database a target value and measure of variability of the target value for a user population of said at least one physiological function measured by said measured value, and computes a difference-from-target value and a standardized value computed from (standardized value)=(difference-from-target value)/(measure of variability of the target value for a user population), outputting said measured value, said target value, said difference-from-target value, and said standardized value to a record of physiologic performance disposed in a file established for said user in said multi-user physiological database; and, further outputting said difference-from-target value, and said standardized value to said physiological data display window for display in said second frame for said user's physiological performance.

33. The physiological user interface of claim 32, wherein if either said difference-from-target value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software; said score is made to appear in said first frame for said user's physiologic performance contained in said physiological data display window by said physiological interface software; and, if said difference-from-target value computed by said physiological comparator program for said user is supratarget or if said standardized value computed by said physiological comparator program for said user is greater than a predefined value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological interface software, and said score is made to appear in said first frame for said user's physiologic performance contained in said physiological data display window by said physiological interface software; and, if said difference-from-target value computed by said physiological comparator program for said user is infratarget, or if said standardized value computed by said physiological comparator program for said user is less than a predefined value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological user interface, and said score is made to appear in said first frame for said user's physiologic performance contained in said physiological data display window by said physiological user interface.

34. The physiological user interface of claim 1, wherein said selectable display mode comprises a default novice display mode causing said at least one output device used by said user to output said first frame displaying therein said score of said user and said score of each other user interacting with said MUVE; and, further causing said at least one output device used by each other user interacting with said MUVE to output said first frame displaying therein said score of said user and said score of each other user interacting with said MUVE.

35. The physiological user interface of claim 1, wherein said selectable display mode comprises a default novice display mode causing said at least one output device used by said user to output said second frame displaying therein said physiological performance profile of said user and said physiological performance profile of each other user interacting with said MUVE; and, further causing said at least one output device used by each other user interacting with said MUVE to output said second frame displaying therein said physiological performance profile of said user and said physiological performance profile of each other user interacting with said MUVE.

36. The physiological user interface of claim 1, wherein said display mode comprises an advanced display mode causing said at least one output device used by said user to output said first frame displaying therein said score of said user and said score of each other user interacting with said MUVE; and, further causing said at least one output device used by each other user interacting with said MUVE to output said first frame displaying therein only said score of each other user interacting with said MUVE, excepting from said display said score of said user.

37. The physiological user interface of claim 1, wherein said selectable display mode comprises an advanced display mode causing said at least one output device used by said user to output said second frame displaying therein said physiological performance profile of said user and said physiological performance profile of each other user interacting with said MUVE; and further causing said at least one output device used by each other user interacting with said MUVE to output said second frame displaying therein only said physiological performance profile of each other user interacting with said MUVE, excepting from said display said physiological performance profile of said user.

38. The physiological user interface of claim 1, wherein said display mode comprises an expert display mode causing said at least one output device used by said user to output said first frame displaying therein said score of said user and said score of each other user interacting with said MUVE; and, further causing said at least one output device used by each other user interacting with said MUVE to output said first frame displaying therein only said score of each other user interacting with said MUVE selected for output by said user.

39. The physiological user interface of claim 1, wherein said display mode comprises an expert display mode causing said at least one output device used by said user to output said second frame displaying therein said physiological performance profile of said user and said physiological performance profile of each other user interacting with said MUVE; and, further causing said at least one output device used by each other user interacting with said MUVE to output said second frame displaying therein only said physiological performance profile of each other user interacting with said MUVE selected for output by said user.

40. A method for incorporating biofeedback training into a user's interaction with a software-generated multi-user virtual environment ("MUVE"), said MUVE being generated on non-transitory computer-readable media, and augmenting said user's sense of immersion in said software-generated multi-user virtual environment comprising the steps of: Obtaining at least one real-time value of a physiological function of said user from an output of at least one biosensory device operatively connected to said user; Subtracting said real-time value of said physiological function from a predefined normal or a target value of said human physiological function to obtain a difference value; and, Applying said difference value to a score of said user's performance while said user is interacting with said MUVE, said score being comprised of performance points, power-up elements and power-down elements, said score further having a first component and a second component, and said step of applying said difference value to said score further comprising the step of: if said difference value is equal to or about zero, then effecting at least one consequence selected from a list consisting of: making a zero contribution to said second component of said score of said user's interaction with said MUVE; making no change in the difficulty of said user's MUVE manual input device, and if said difference value is supranormal or supratarget, effecting at least one consequence selected from a list consisting of: adding at least one performance point to said second component of said score of said user's interaction with said MUVE; adding at least one power-up element to said second component of said score of said user's interaction with said MUVE; and increasing the ease of control of a MUVE manual input device, and if said difference value is infranormal or infratarget, effecting at least one consequence selected from a list consisting of: subtracting at least one performance point from said second component of said score of said user's interaction with said MUVE; adding at least one power-down element to said second component of said score of said user's interaction with said MUVE; and increasing the difficulty of control of said user's MUVE manual input device.

41. The method of claim 40, wherein said real-time value is a measured value, said predefined value is a normal value for a given population of users and said difference value is a difference-from-normal value.

42. The method of claim 40, wherein said real-time value is a measured value, said predefined value is a target value, either artificially defined or referenced to said user's baseline physiological performance, and said difference value is a difference-from-target value.

43. The method of claim 40, wherein said real-time value is a measured average value, said predefined value is a normal average value for a given population of users and said difference value is a difference-from-normal average value.

44. The method of claim 40, wherein said real-time value is a measured average value, said predefined value is a target average value, either artificially defined or referenced to said user's baseline physiological performance, and said difference value is a difference-from-target average value.

45. The method of claim 40, wherein said real-time value is a measured change in value, said predefined value is a normal change in value for a given population of users and said difference value is a difference-from-normal change in value.

46. The method of claim 40, wherein said real-time value is a measured change in value, said predefined value is a target change in value, either artificially defined or referenced to said user's baseline physiological performance, and said difference value is a difference-from-target change in value.

47. The method of claim 40, wherein said real-time value is a measured average rate of change in value, said predefined value is a normal average rate of change in value for a given population of users and said difference value is a difference-from-normal average rate of change in value.

48. The method of claim 40, wherein said real-time value is a measured average rate of change in value, said predefined value is a target average rate of change in value, either artificially defined or referenced to said user's baseline physiological performance, and said difference value is a difference-from-target average rate of change in value.

49. The method of claim 40, wherein said real-time value is a measured rate of change in value, said predefined value is a normal rate of change in value for a given population of users and said difference value is a difference-from-normal average rate of change in value.

50. The method of claim 40, wherein said real-time value is a measured rate of change in value, said predefined value is a target rate of change in value, either artificially defined or referenced to said user's baseline physiological performance, and said difference value is a difference-from-target rate of change in value.

51. The method of claim 40, wherein said real-time value is a measured value of said user, said predefined value is a corresponding benchmark value of said physiological function and said difference value is a standardized value computed from (standardized value)=(difference-from-benchmark value)/(measure of variability of said benchmark value for a user population).

52. The method of claim 40, wherein said MUVE comprises a multi-user videogame.

53. The method of claim 40, wherein said MUVE comprises a multi-user computer simulation.

54. The method of claim 40, wherein said at least one biosensory device communicates with an interactive device hosting physiological interface software, said interactive device comprising a local computing device operatively connected to at least one input device and at least one output device, said interactive device further being disposed on a communications network on which there is also disposed at least one server hosting software generative of said MUVE.

55. The method of claim 54, wherein said at least one input device controls actions of an avatar representative of said user in said MUVE, said actions of said avatar contributing to a first component of said score of said user's interaction with said MUVE.

56. The method of claim 55, wherein said step of obtaining said output of said at least one biosensory device operatively connected to said user comprises encoding a measured value of at least one physiological function of said user in a signal output by said biosensory device.

57. The method of claim 56, wherein said at least one physiological function is selected from a list consisting of skin temperature, body temperature, skin conductance, blood pressure, respiratory rate, hemoglobin oxygen saturation, heart rate, electrocardiographic activity, electromyographic activity and electroencephalographic activity.

58. The method of claim 56, wherein there accrues to said avatar an assignable physiological performance record of said user represented by said avatar comprising at least one of: said measured values; and a performance profile of said user comprising at least one of: difference-from-normal values; difference-from-target values; and standardized values.

59. The method of claim 58, wherein said physiological interface software comprises a physiological comparator program; a multi-user physiological database; a benchmark physiological database; and, a physiological data display window caused to be displayed on said at least one output device by said physiological interface software in accordance with a selectable display mode, said physiological data display window containing a first frame for said user's physiological performance, wherein there may be displayed said score of said user's interaction with said MUVE and a score of each other user interacting with said MUVE, said physiological data display window further containing a second frame for said user's physiological performance, wherein there may be displayed said physiological performance profile of said user and said physiological performance profile for each other user interacting with said MUVE.

60. The method of claim 59, wherein, upon attaining a threshold score, said user may command said physiological interface software to selectably donate performance points from said user's score to said score of each other user interacting with said MUVE, thereby decreasing said user's score by the number of performance points so donated.

61. The method of claim 59, wherein, upon attaining a threshold score, said user may command said physiological interface software to selectably withdraw performance points from said score of each other user interacting with said MUVE, thereby increasing said user's score by the number of performance points so withdrawn.

62. The method of claim 59, wherein said selectable display mode comprises a default novice display mode causing said at least one output device used by said user to output said first frame displaying therein said score of said user and said score of each other user interacting with said MUVE; and, further causing said at least one output device used by each other user interacting with said MUVE to output said first frame displaying therein said score of said user and said score of each other user interacting with said MUVE.

63. The method of claim 59, wherein said selectable display mode comprises a default novice display mode causing said at least one output device used by said user to output said second frame displaying therein said physiological performance profile of said user and said physiological performance profile of each other user interacting with said MUVE; and, further causing said at least one output device used by each other user interacting with said MUVE to output said second frame displaying therein said physiological performance profile of said user and said physiological performance profile of each other user interacting with said MUVE.

64. The method of claim 59, wherein said display mode comprises an advanced display mode causing said at least one output device used by said user to output said first frame displaying therein said score of said user and said score of each other user interacting with said MUVE; and, further causing said at least one output device used by each other user interacting with said MUVE to output said first frame displaying therein only said score of each other user interacting with said MUVE, excepting from said display said score of said user.

65. The method of claim 59, wherein said selectable display mode comprises an advanced display mode causing said at least one output device used by said user to output said second frame displaying therein said physiological performance profile of said user and said physiological performance profile of each other user interacting with said MUVE; and, further causing said at least one output device used by each other user interacting with said MUVE to output said second frame displaying therein only said physiological performance profile of each other user interacting with said MUVE, excepting from said display said physiological performance profile of said user.

66. The method of claim 59, wherein said display mode comprises an expert display mode causing said at least one output device used by said user to output said first frame displaying therein said score of said user and said score of each other user interacting with said MUVE; and, further causing said at least one output device used by each other user interacting with said MUVE to output said first frame displaying therein only said score of each other user interacting with said MUVE selected for output by said user.

67. The method of claim 59, wherein said display mode comprises an expert display mode causing said at least one output device used by said user to output said second frame displaying therein said physiological performance profile of said user and said physiological performance profile of each other user interacting with said MUVE; and, further causing said at least one output device used by each other user interacting with said MUVE to output said second frame displaying therein only said physiological performance profile of each other user interacting with said MUVE selected for output by said user.

68. The method of claim 59, wherein said benchmark physiological data base receives as input, stores, maintains and outputs predefined values of human physiological functions, comprising: normal values; target values; normal changes in values; target changes in values; normal rates of change in values; and, target rates of change in values.

69. The method of claim 59, wherein said physiological comparator program receives as input from said biosensory device said measured value of at least one physiological function of said user, said measured value being encoded in said output of said at least one biosensory device upon detection and measurement of said at least one physiological function of said user by said at least one biosensory device in accordance with a selectable mode of detection and measurement.

70. The method of claim 69, wherein said selectable mode of detection and measurement by said at least one biosensory device comprises a periodic detection and measurement mode, said at least one biosensory device outputting said measured value of said at said least one physiological function to said physiological comparator program as a periodically measured value.

71. The method of claim 70, wherein said physiological comparator program receives as input from said at least one biosensory device a first periodically measured value corresponding to a first time and a second periodically measured value corresponding to a second time, and computes a measured change in value as the algebraic difference between said first periodically measured value and said second periodically measured value.

72. The method of claim 71, wherein following computation of said measured change in value, said physiological comparator program obtains as input from said benchmark physiological database a normal change in value and measure of variability of the normal change in value for a user population of said at least one physiological function measured by said measured value, and computes a difference-from-normal change in value and a standardized value computed from (standardized value)=(difference-from-normal change in value)/(measure of variability of the normal change in value for a user population), outputting said measured change in value, said normal change in value, said difference-from-normal change in value, and said standardized value to a record of physiologic performance disposed in a file established for said user in said multi-user physiological database; and, further outputting said difference-from-normal change in value, and said standardized value to said physiological data display window for display in said second frame for said user's physiological performance.

73. The method of claim 72, wherein if said difference-from-normal change in value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software; said score is made to appear in said first frame for said user's physiologic performance contained in said physiological data display window by said physiological interface software; and, if said difference-from-normal change in value computed by said physiological comparator program for said user is supranormal or if said standardized value computed by said physiological comparator program for said user is greater than a predefined value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological interface software, and said score is made to appear in said first frame for said user's physiologic performance contained in said physiological data display window by said physiological interface software; and, if said difference-from-normal change in value computed by said physiological comparator program for said user is infranormal, or if said standardized value computed by said physiological comparator program for said user is less than a predefined value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological interface software, and said score is made to appear in said first frame for said user's physiologic performance contained in said physiological data display window by said physiological interface software.

74. The method of claim 71, wherein following computation of said measured change in value, said physiological comparator program obtains as input from said benchmark physiological database a target change in value and measure of variability of the target change in value for a user population of said at least one physiological function measured by said measured value, and computes a difference-from-target change in value and a standardized value computed from (standardized value)=(difference-from-target change in value)/(measure of variability of the target change in value for a user population), outputting said measured change in value, said target change in value, said difference-from-target change in value, and said standardized value to a record of physiologic performance disposed in a file established for said user in said multi-user physiological database; and, further outputting said difference-from-target change in value, and said standardized value to said physiological data display window for display in said second frame for said user's physiological performance.

75. The method of claim 74, wherein if said difference-from-target change in value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software, said score is made to appear in said first frame for said user's physiologic performance contained in said physiological data display window by said physiological interface software; and, if said difference-from-target change in value computed by said physiological comparator program for said user is supratarget or if said standardized value computed by said physiological comparator program for said user is greater than a predefined value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said scores the control by said user of said at least one input device is made easier proportionate to said standardized value, said score is recorded to said user-identified, session-specific record of score by said physiological interface software, and said score is made to appear in said first frame for said user's physiologic performance contained in said physiological data display window by said physiological interface software; and, if said difference-from-target change in value computed by said physiological comparator program for said user is infratarget, or if said standardized value computed by said physiological comparator program for said user is less than a predefined value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological interface software, and said score is made to appear in said first frame for said user's physiologic performance contained in said physiological data display window by said physiological interface software.

76. The method of claim 70, wherein said physiological comparator program receives as input from said at least one biosensory device a first periodically measured value corresponding to a first time and a second periodically measured value corresponding to a second time, and computes a measured average rate of change in value as the algebraic difference between said first periodically measured value and said second periodically measured value divided by the time elapsed from said first time to said second time.

77. The method of claim 76, wherein following computation of said measured average rate of change in value, said physiological comparator program obtains as input from said benchmark physiological database a normal average rate of change in value and measure of variability of the normal average rate of change in value for a user population of said at least one physiological function measured by said measured value, and computes a difference-from-normal average rate of change in value and a standardized value computed from (standardized value)=(difference-from-normal average rate of change in value)/(measure of variability of the normal average rate of change in value for a user population), outputting said measured average rate of change in value, said normal average rate of change in value, said difference-from-normal average rate of change in value, and said standardized value to a record of physiologic performance disposed in a file established for said user in said multi-user physiological database; and, further outputting said difference-from-normal average rate of change in value, and said standardized value to said physiological data display window for display in said second frame for said user's physiological performance.

78. The method of claim 77, wherein if said difference-from-normal average rate of change in value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software; said score is made to appear in said first frame for said user's physiologic performance contained in said physiological data display window by said physiological interface software; and, if said difference-from-normal average rate of change in value computed by said physiological comparator program for said user is supranormal or if said standardized value computed by said physiological comparator program for said user is greater than a predefined value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological interface software, and said score is made to appear in said first frame for said user's physiologic performance contained in said physiological data display window by said physiological interface software; and, if said difference-from-normal average rate of change in value computed by said physiological comparator program for said user is infranormal, or if said standardized value computed by said physiological comparator program for said user is less than a predefined value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological interface software, and said score is made to appear in said first frame for said user's physiologic performance contained in said physiological data display window by said physiological interface software.

79. The method of claim 76, wherein following computation of said measured average rate of change in value, said physiological comparator program obtains as input from said benchmark physiological database a target average rate of change in value and measure of variability of the target average rate of change in value for a user population of said at least one physiological function measured by said measured value, and computes a difference-from-target average rate of change in value and a standardized value computed from (standardized value)=(difference-from-target average rate of change in value)/(measure of variability of the target average rate of change in value for a user population), outputting said measured average rate of change in value, said target average rate of change in value, said difference-from-target average rate of change in value, and said standardized value to a record of physiologic performance disposed in a file established for said user in said multi-user physiological database; and, further outputting said difference-from-target average rate of change in value, and said standardized value to said physiological data display window for display in said second frame for said user's physiological performance.

80. The method of claim 79, wherein if said difference-from-target average rate of change in value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software; said score is made to appear in said first frame for said user's physiologic performance contained in said physiological data display window by said physiological interface software; and, if said difference-from-target average rate of change in value computed by said physiological comparator program for said user is supratarget or if said standardized value computed by said physiological comparator program for said user is greater than a predefined value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological interface software, and said score is made to appear in said first frame for said user's physiologic performance contained in said physiological data display window by said physiological interface software; and, if said difference-from-target average rate of change in value computed by said physiological comparator program for said user is infratarget, or if said standardized value computed by said physiological comparator program for said user is less than a predefined value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological interface software, and said score is made to appear in said first frame for said user's physiologic performance contained in said physiological data display window by said physiological interface software.

81. The method of claim 69, wherein said selectable mode of detection and measurement by said at least one biosensory device comprises a continuous detection and measurement mode, said at least one biosensory device outputting said measured value of at least one physiological function to said physiological comparator program as a continuously measured value.

82. The method of claim 81, wherein said physiological comparator program receives as input from said at least one biosensory device a continuously measured value and computes a measured rate of change in value as the derivative with respect to time of said continuously measured value.

83. The method of claim 82, wherein following computation of said measured rate of change in value, said physiological comparator program obtains as input from said benchmark physiological database a normal rate of change in value and measure of variability of the normal rate of change in value for a user population of said at least one physiological function measured by said measured value, and computes a difference-from-normal rate of change in value and a standardized value computed from (standardized value)=(difference-from-normal rate of change in value)/(measure of variability of the normal rate of change in value for a user population), outputting said measured rate of change in value, said normal rate of change in value, said difference-from-normal rate of change in value, and said standardized value to a record of physiologic performance disposed in a file established for said user in said multi-user physiological database; and, further outputting said difference-from-normal rate of change in value, and said standardized value to said physiological data display window for display in said second frame for said user's physiological performance.

84. The method of claim 83, wherein if said difference-from-normal rate of change in value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software; said score is made to appear in said first frame for said user's physiologic performance contained in said physiological data display window by said physiological interface software; and, if said difference-from-normal rate of change in value computed by said physiological comparator program for said user is supranormal or if said standardized value computed by said physiological comparator program for said user is greater than a predefined value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological interface software, and said score is made to appear in said first frame for said user's physiologic performance contained in said physiological data display window by said physiological interface software; and, if said difference-from-normal rate of change in value computed by said physiological comparator program for said user is infranormal, or if said standardized value computed by said physiological comparator program for said user is less than a predefined value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological interface software, and said score is made to appear in said first frame for said user's physiologic performance contained in said physiological data display window by said physiological interface software.

85. The method of claim 82, wherein following computation of said measured rate of change in value, said physiological comparator program obtains as input from said benchmark physiological database a target rate of change in value and measure of variability of the target rate of change in value for a user population of said at least one physiological function measured by said measured value, and computes a difference-from-target rate of change in value and a standardized value computed from (standardized value)=(difference-from-target rate of change in value)/(measure of variability of the target rate of change in value for a user population), outputting said measured rate of change in value, said target rate of change in value, said difference-from-target rate of change in value, and said standardized value to a record of physiologic performance disposed in a file established for said user in said multi-user physiological database; and, further outputting said difference-from-target rate of change in value, and said standardized value to said physiological data display window for display in said second frame for said user's physiological performance.

86. The method of claim 85, wherein if said difference-from-target rate of change in value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software; said score is made to appear in said first frame for said user's physiologic performance contained in said physiological data display window by said physiological interface software; and, if said difference-from-target rate of change in value computed by said physiological comparator program for said user is supratarget or if said standardized value computed by said physiological comparator program for said user is greater than a predefined value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological interface software, and said score is made to appear in said first frame for said user's physiologic performance contained in said physiological data display window by said physiological interface software; and, if said difference-from-target rate of change in value computed by said physiological comparator program for said user is infratarget, or if said standardized value computed by said physiological comparator program for said user is less than a predefined value, then at least one consequence is effected, selected from a list consisting of a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological interface software, and said score is made to appear in said first frame for said user's physiologic performance contained in said physiological data display window by said physiological interface software.

87. The method of claim 69, wherein said selectable mode of detection and measurement by said at least one biosensory device comprises an average detection and measurement mode, said at least one biosensory device outputting said measured value of at least one physiological function to said physiological comparator program as a plurality of periodically measured values averaged over a predefined period of time.

88. The method of claim 87, wherein upon receipt of said measured average value, said physiological comparator program obtains as input from said benchmark physiological database a normal average value and measure of variability of the normal average value for a user population of said at least one physiological function measured by said measured value, and computes a difference-from-normal average value and a standardized value computed from (standardized value)= (difference-from-normal average value)/(measure of variability of the normal average value for a user population), outputting said measured average value, said normal average value, said difference-from-normal average value, and said standardized value to a record of physiologic performance disposed in a file established for said user in said multi-user physiological database; and, further outputting said difference-from-normal average value, and said standardized value to said physiological data display window for display in said second frame for said user's physiological performance.

89. The method of claim 88, wherein if said difference-from-normal average value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software; said score is made to appear in said first frame for said user's physiologic performance contained in said physiological data display window by said physiological interface software; and, if said difference-from-normal average value computed by said physiological comparator program for said user is supranormal or if said standardized value computed by said physiological comparator program for said user is greater than a predefined average value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological interface software, and said score is made to appear in said first frame for said user's physiologic performance contained in said physiological data display window by said physiological interface software; and, if said difference-from-normal average value computed by said physiological comparator program for said user is infranormal, or if said standardized value computed by said physiological comparator program for said user is less than a predefined average value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological interface software, and said score is made to appear in said first frame for said user's physiologic performance contained in said physiological data display window by said physiological interface software.

90. The method of claim 87, wherein upon receipt of said measured average value, said physiological comparator program obtains as input from said benchmark physiological database a target average value and measure of variability of the target average value for a user population of said at least one physiological function measured by said measured value, and computes a difference-from-target average value and a standardized value computed from (standardized value)= (difference-from-target average value)/(measure of variability of the target average value for a user population), outputting said measured average value, said target average value, said difference-from-target average value, and said standardized value to a record of physiologic performance disposed in a file established for said user in said multi-user physiological database; and, further outputting said difference-from-target average value, and said standardized value to said physiological data display window for display in said second frame for said user's physiological performance.

91. The method of claim 90, wherein if said difference-from-target average value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software; said score is made to appear in said first frame for said user's physiologic performance contained in said physiological data display window by said physiological interface software; and, if said difference-from-target average value computed by said physiological comparator program for said user is supratarget or if said standardized value computed by said physiological comparator program for said user is greater than a predefined average value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological interface software, and said score is made to appear in said first frame for said user's physiologic performance contained in said physiological data display window by said physiological interface software; and, if said difference-from-target average value computed by said physiological comparator program for said user is infratarget, or if said standardized value computed by said physiological comparator program for said user is less than a predefined average value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological interface software, and said score is made to appear in said first frame for said user's physiologic performance contained in said physiological data display window by said physiological interface software.

92. The method of claim 69, wherein upon receipt of said measured value from said at least one biosensory device, said physiological comparator program obtains as input from said benchmark physiological database a normal value and measure of variability of the normal value for a user population of said at least one physiological function measured by said measured value, and computes a difference-from-normal value and a standardized value computed from (standardized value)=(difference-from-normal value)/(measure of variability of the normal value for a user population), outputting said measured value, said normal value, said difference-from-normal value, and said standardized value to a record of physiologic performance disposed in a file established for said user in said multi-user physiological database; and, further outputting said difference-from-normal value, and said standardized value to said physiological data display window for display in said second frame for said user's physiological performance.

93. The method of claim 92, wherein if either said difference-from-normal value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software; said score is made to appear in said first frame for said user's physiologic performance contained in said physiological data display window by said physiological interface software; and, if said difference-from-normal value computed by said physiological comparator program for said user is supranormal or if said standardized value computed by said physiological comparator program for said user is greater than a predefined value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological interface software, and said score is made to appear in said first frame for said user's physiologic performance contained in said physiological data display window by said physiological interface software; and, if said difference-from-normal value computed by said physiological comparator program for said user is infranormal, or if said standardized value computed by said physiological comparator program for said user is less than a predefined value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological interface software, and said score is made to appear in said first frame for said user's physiologic performance contained in said physiological data display window by said physiological interface software.

94. The method of claim 69, wherein upon receipt of said measured value from said at least one biosensory device, said physiological comparator program obtains as input from said benchmark physiological database a target value and measure of variability of the target value for a user population of said at least one physiological function measured by said measured value, and computes a difference-from-target value and a standardized value computed from (standardized value)=(difference-from-target value)/(measure of variability of the target value for a user population), outputting said measured value, said target value, said difference-from-target value, and said standardized value to a record of physiologic performance disposed in a file established for said user in said multi-user physiological database; and, further outputting said difference-from-target value, and said standardized value to said physiological data display window for display in said second frame for said user's physiological performance.

95. The method of claim 94, wherein if either said difference-from-target value or said standardized value computed by said physiological comparator program for said user is equal to or about zero, then at least one consequence is effected, selected from a list consisting of: a zero contribution is made by said physiological comparator program to said score of said user's interaction with said MUVE; a zero contribution is made by said physiological comparator program to said power-up elements of said user's interaction with said MUVE; the difficulty of control by the user of said at least one input device is unchanged; said score is recorded to a user-identified, session-specific record of score by said physiological interface software; said score is made to appear in said first frame for said user's physiologic performance contained in said physiological data display window by said physiological interface software; and, if said difference-from-target value computed by said physiological comparator program for said user is supratarget or if said standardized value computed by said physiological comparator program for said user is greater than a predefined value, then at least one consequence is effected, selected from a list consisting of: an addition of at least one performance point is made by said physiological comparator program to said score of said user's interaction with said MUVE, at least one power-up element is added to said score, an addition of a number of performance points proportionate to said standardized value is made by said physiological comparator program to said score of said user's interaction with said MUVE, a number of power-up elements proportionate to said standardized value are added to said score, the control by said user of said at least one input device is made easier proportionate to said standardized value, said score is recorded to said user-identified, session-specific record of score by said physiological interface software, and said score is made to appear in said first frame for said user's physiologic performance contained in said physiological data display window by said physiological interface software; and, if said difference-from-target value computed by said physiological comparator program for said user is infratarget, or if said standardized value computed by said physiological comparator program for said user is less than a predefined value, then at least one consequence is effected, selected from a list consisting of: a subtraction of at least one performance point is made by said physiological comparator program from said score of said user's interaction with said MUVE, at least one power-down element is added to said score, a subtraction of a number of performance points proportionate from said standardized value is made by said physiological comparator program to said score of said user's interaction with said MUVE, a number of power-up elements proportionate to said standardized value are subtracted from said score, the control by said user of said at least one input device is made more difficult proportionate to said standardized value, said score is recorded to said user-identified, session-specific record of score by said physiological interface software, and said score is made to appear in said first frame for said user's physiologic performance contained in said physiological data display window by said physiological interface software.

96. The method of claim 58, wherein said avatar's physiological performance record may be added by said physiological interface software to an assignee avatar whose behavior in said MUVE is thereafter determined and controlled independently of said user by said physiological interface software utilizing said physiological performance record.

97. The method of claim 54, wherein said communications network supports peer-to-peer file sharing and interaction between said interactive devices and said at least one server.

98. The method of claim 40, wherein said software generative of said MUVE is hosted by said at least at least one server and said at least one input device.

99. The method of claim 40, wherein said at least one biosensory device communicates with an interactive device hosting physiological interface software, said interactive device comprising a local computing device operatively connected to at least one input device and at least one output device, said interactive device further interacting with one server hosting software generative of said MUVE.

* * * * *